US011941951B2

(12) United States Patent
Nakamoto

(10) Patent No.: US 11,941,951 B2
(45) **Date of Patent: *Mar. 26, 2024**

(54) GAMING MACHINE, CONTROL METHOD FOR MACHINE, AND PROGRAM FOR GAMING MACHINE

(71) Applicant: Konami Gaming, Inc., Las Vegas, NV (US)

(72) Inventor: Atsushi Nakamoto, Zama (JP)

(73) Assignee: Konami Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/110,044

(22) Filed: Feb. 15, 2023

(65) Prior Publication Data

US 2023/0290221 A1 Sep. 14, 2023

Related U.S. Application Data

(63) Continuation of application No. 17/024,566, filed on Sep. 17, 2020, now Pat. No. 11,625,983, which is a continuation of application No. 15/132,665, filed on Apr. 19, 2016, now Pat. No. 10,818,139.

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/3244* (2013.01); *G07F 17/34* (2013.01)

(58) Field of Classification Search
None
See application file for complete search history.

(56) References Cited

U.S. PATENT DOCUMENTS 7,485,038 B2 2/2009 Rathkranz et al.
7,819,742 B2 * 10/2010 Chamberlain ........... G07G 5/00 463/16
8,257,161 B2 9/2012 Louie et al.
8,690,664 B2 4/2014 Esses et al.
9,640,026 B2 5/2017 Mizue
9,704,342 B2 7/2017 Aoki et al.
9,747,757 B2 8/2017 Berman
9,786,116 B2 10/2017 Saunders
10,818,139 B2 * 10/2020 Nakamoto .......... G07F 17/3267
2005/0054422 A1 3/2005 Rothkranz et al.
2006/0058097 A1 3/2006 Berman et al.
2008/0076513 A1 3/2008 Esses et al.
2012/0122547 A1 * 5/2012 Aoki ....................... G07F 17/34 463/20

(Continued)

*Primary Examiner* — Peter J Iannuzzi
(74) *Attorney, Agent, or Firm* — Howard & Howard Attorneys PLLC

(57) ABSTRACT

A gaming machine provides an operation unit, a display unit, and a control unit. The operation unit is configured to receive an operation of the player. The display unit is operably coupled to the operation unit and is configured to display a first display area with a first grid of cells, and a second display area with a second grid of cells. The first symbol display area includes a first plurality of cells arranged in a first grid. The control unit randomly establishes a bonus pattern of symbols in the second grid of cells and copies the bonus pattern of symbols into the first grid of cells.

20 Claims, 33 Drawing Sheets

(56) References Cited

U.S. PATENT DOCUMENTS

| | | | |
|---|---|---|---|
| 2014/0274295 | A1 | 9/2014 | Poole et al. |
| 2015/0080096 | A1 | 3/2015 | Saunders et al. |
| 2015/0287269 | A1 | 10/2015 | Berman |
| 2015/0348374 | A1 | 12/2015 | Dupuis |
| 2016/0027251 | A1 | 1/2016 | SeLegue et al. |
| 2016/0086427 | A1 | 3/2016 | Nakamura |
| 2016/0125687 | A1 | 5/2016 | Berman |
| 2017/0092073 | A1 | 3/2017 | Nakamura |

* cited by examiner

GAMING MACHINE, CONTROL METHOD FOR MACHINE, AND PROGRAM FOR GAMING MACHINE

CROSS-REFERENCE TO RELATED APPLICATION

This application is a continuation of U.S. patent application Ser. No. 17/024,566, filed Sep. 17, 2020, which is a continuation of U.S. patent application Ser. No. 15/132,665, filed Apr. 19, 2016 (now U.S. Pat. No. 10,818,139, issued Oct. 27, 2020), the disclosure of which are hereby incorporated by reference in their entirety.

TECHNICAL FIELD

The present invention relates to a gaming machine, a control method for a gaming machine, and a program for a gaming machine.

BACKGROUND ART

A gaming machine represented by a slot machine is highly popular among casino customers as a device that provides gaming that is easy to enjoy, and recent statistics report that sales from gaming machines account for the majority of casino earnings. Initial slot machines were simple devices, wherein an inserted coin is received, a configured reel rotates and stops mechanically according to a handle operation, and a win or a loss is determined by a combination of symbols stopped on a single pay line. However, recent gaming machines, such as mechanical slot machines driven by a highly accurate physical reel via a computer controlled stepping motor, video slot machines that display a virtual reel on a display connected to a computer, and various gaming machines that apply similar technology to other casino games are quickly advancing. For the manufacturers that develop these gaming machines, an important theme is to provide an attractive game that strongly attracts casino customers as players, and improves the functionality of the gaming machine.

SUMMARY OF INVENTION

In one aspect of the present invention, a gaming machine is provided. The gaming machine includes an operation unit, a display unit, and a control unit. The operation unit is configured to receive an operation of the player. The display unit is operably coupled to the operation unit and is configured to display a first display area and a second display area. The first symbol display area includes a first plurality of cells arranged in a first grid. The first grid has a plurality of rows and a plurality of columns. The second symbol display area includes a second plurality of cells arranged in a second grid. The second grid has a plurality of rows and a plurality of columns. Each cell of the second plurality of cells is associated with one of the cells of the first plurality of cells. The control unit is operably coupled to the operation unit and the display unit and is configured to initiate a game in response to player operation and to establish an outcome of the game. The control unit, in response to initiation of the game, is further configured to:

randomly select a first plurality of symbols associated with the first symbol display area, each symbol in the first set of symbols being associated with one of the plurality of cells in the first grid, the symbols in the first plurality of symbols being selected from a first set of symbols, the first plurality of symbols forming an initial outcome;

randomly select a second plurality of symbols being associated with the second symbol display area, each symbol in the second set of symbols being associated with one of the plurality of cells in the second grid, the symbols in the second plurality of symbols being selected from a second set of symbols, the second set of symbols including a null symbol and at least one non-null symbol, the second plurality of symbols forming a bonus pattern of symbols;

copy the bonus pattern of symbols from the second grid to the first grid, the bonus pattern of symbols and any remaining symbols from the first plurality of symbols in the first grid forming a second outcome; and award a payout to the player as a function of the second outcome.

In another aspect of the invention, a control method for a gaming machine provides a game to a player. The gaming machine includes an operation unit, a display unit, and a control unit. The operation unit is configured to receive an operation of the player. The display unit is operably coupled to the operation unit and is configured to display a first display area and a second display area. The first symbol display area includes a first plurality of cells arranged in a first grid. The first grid has a plurality of rows and a plurality of columns. The second symbol display area includes a second plurality of cells arranged in a second grid. The second grid has a plurality of rows and a plurality of columns. Each cell of the second plurality of cells is associated with one of the cells of the first plurality of cells. The method including the steps of:

randomly selecting a first plurality of symbols associated with the first symbol display area, each symbol in the first set of symbols being associated with one of the plurality of cells in the first grid, the symbols in the first plurality of symbols being selected from a first set of symbols, the first plurality of symbols forming an initial outcome;

randomly selecting a second plurality of symbols being associated with the second symbol display area, each symbol in the second set of symbols being associated with one of the plurality of cells in the second grid, the symbols in the second plurality of symbols being selected from a second set of symbols, the second set of symbols including a null symbol and at least one non-null symbol, the second plurality of symbols forming a bonus pattern of symbols;

copying the bonus pattern of symbols from the second grid to the first grid, the bonus pattern of symbols and any remaining symbols from the first plurality of symbols in the first grid forming a second outcome; and awarding a payout to the player as a function of the second outcome.

In still another aspect of the present invention, a program for a gaming machine provides a game to a player. The gaming machine includes an operation unit, a display unit, and a control unit. The operation unit is configured to receive an operation of the player. The display unit is operably coupled to the operation unit and is configured to display a first display area and a second display area. The first symbol display area includes a first plurality of cells arranged in a first grid. The first grid has a plurality of rows and a plurality of columns. The second symbol display area includes a second plurality of cells arranged in a second grid. The second grid has a plurality of rows and a plurality of columns. Each cell of the second plurality of cells is associated with one of the cells of the first plurality of cells. The control unit is operably coupled to the operation unit and the display unit and is configured to initiate a game in response to player operation and to establish an outcome of the game. The program of the gaming machine performs the steps of:

randomly selecting a first plurality of symbols associated with the first symbol display area, each symbol in the first set of symbols being associated with one of the plurality of cells in the first grid, the symbols in the first plurality of symbols being selected from a first set of symbols, the first plurality of symbols forming an initial outcome;

randomly selecting a second plurality of symbols being associated with the second symbol display area, each symbol in the second set of symbols being associated with one of the plurality of cells in the second grid, the symbols in the second plurality of symbols being selected from a second set of symbols, the second set of symbols including a null symbol and at least one non-null symbol, the second plurality of symbols forming a bonus pattern of symbols;

copying the bonus pattern of symbols from the second grid to the first grid, the bonus pattern of symbols and any remaining symbols from the first plurality of symbols in the first grid forming a second outcome; and awarding a payout to the player as a function of the second outcome.

DETAILED DESCRIPTION OF EMBODIMENTS

A gaming machine, according to an embodiment of the present invention, referencing the attached figures is described in detail below. Further, duplicated descriptions will be omitted for identical attached symbols in identical or corresponding parts in each figure.

With reference to the drawings, and in operation, the present invention is directed towards a gaming machine, a control method for a gaming machine, and a program for a gaming machine that provides a game to a player. During the game, a first grid of cells and a second grid of cells are displayed or in respective first and second display areas. During the game, an initial plurality of symbols is established for the first grid of cells and a bonus pattern of symbols is established in the second grid of cells. The bonus pattern of symbols is copied to the first grid of cells.

The game may include a primary game, a bonus game and/or a feature. The bonus pattern of cells may be established and copied to the first grid of cells during the primary game, the bonus game and/or the feature.

Figure 1A:
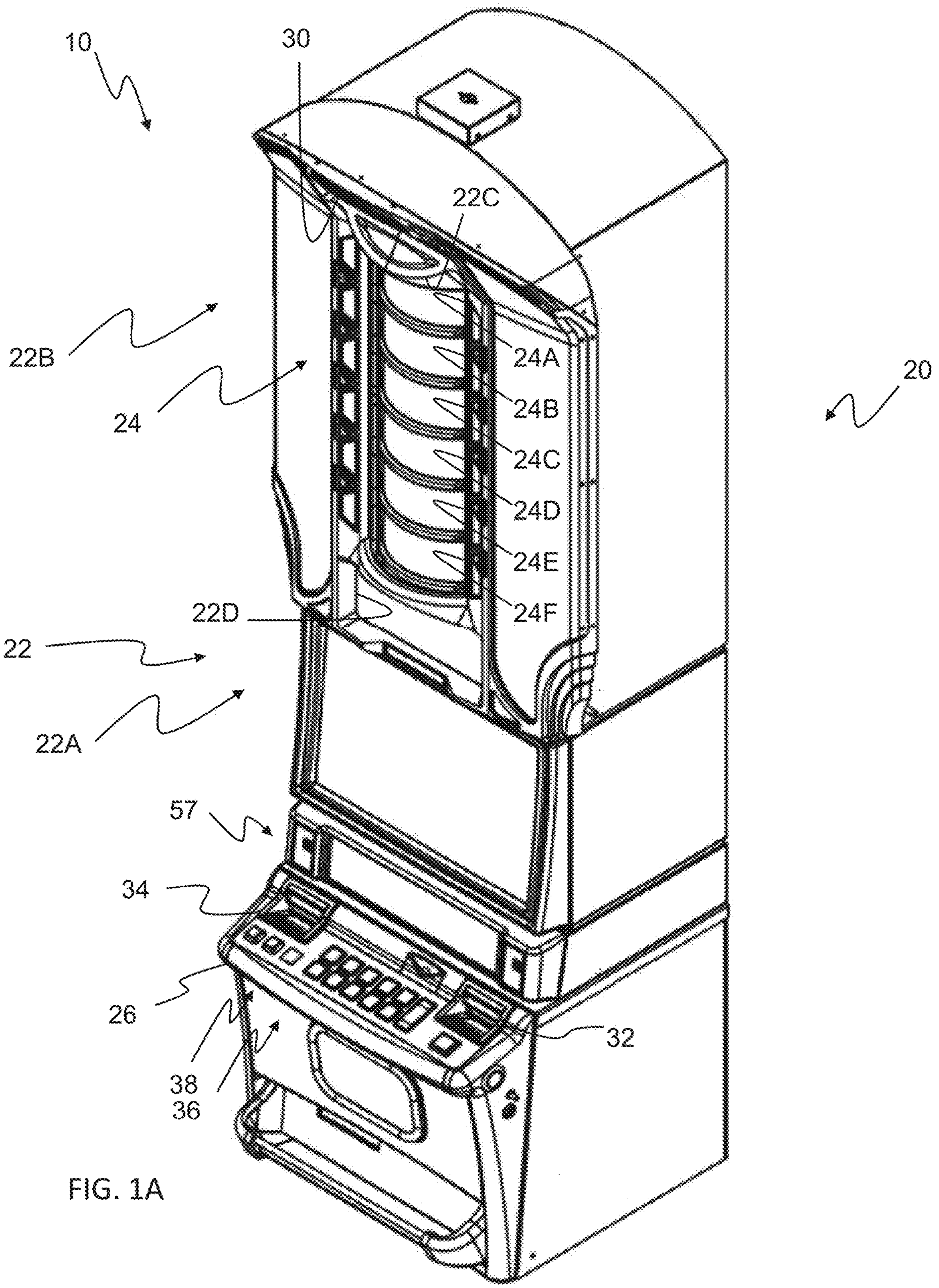
FIG. 1A is a perspective view of the gaming machine, according to the first embodiment.
Figure 1B:
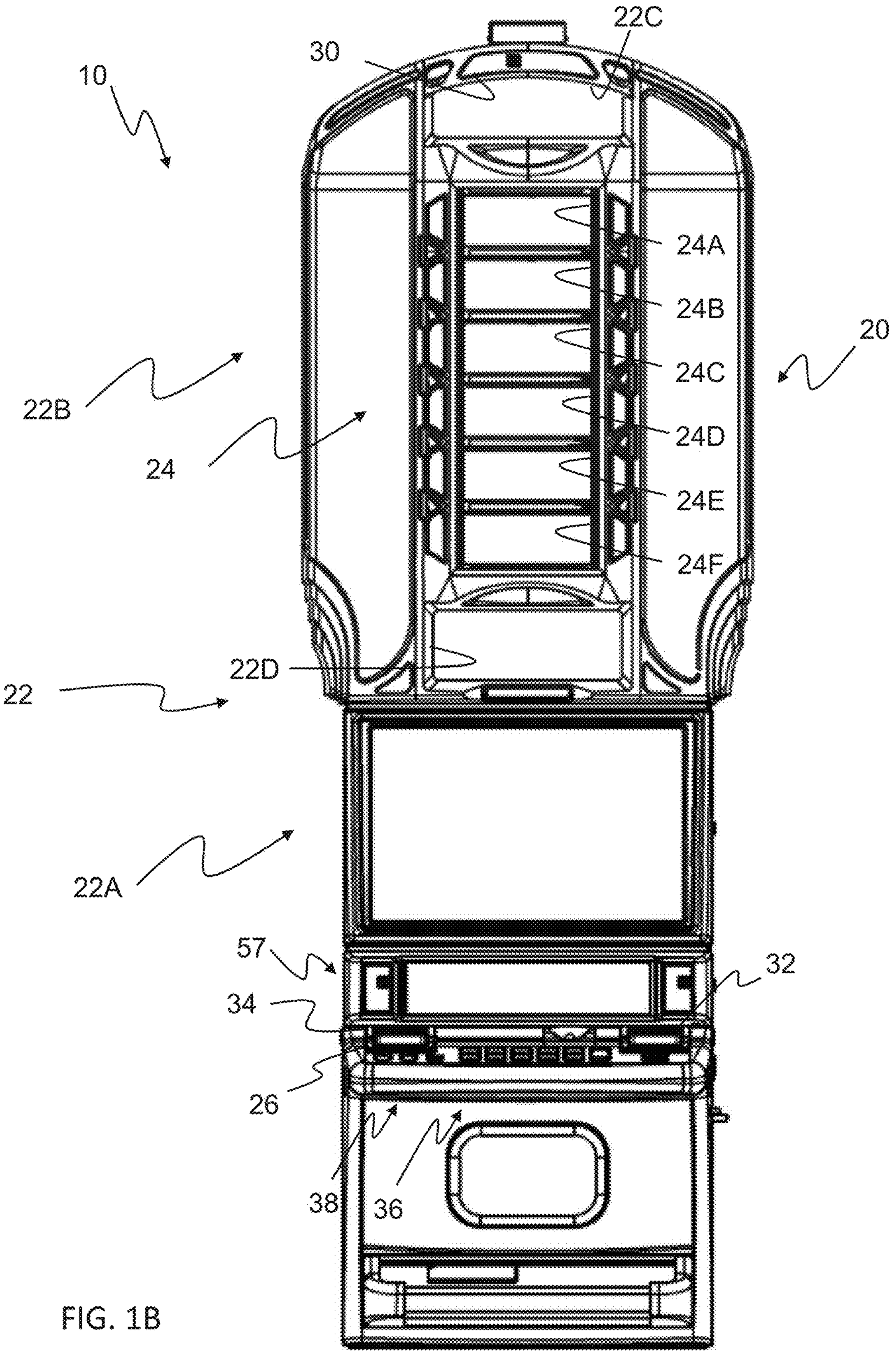
FIG. 1B is a front view of the gaming machine of FIG. 1A.

The gaming machine, according to the present embodiment, receives a predetermined game value from the player, generates a game result, and provides a payout to the player according to the game result. FIG. 1A and FIG. 1B are a perspective view and a front view, respectively, of a gaming machine 10, according to the present embodiment. As shown in FIG. 1, the gaming machine 10 provides a cabinet 20 providing a display unit 22, a control panel 26 and may also house a player tracking or ranking unit 57. The cabinet 20 also houses a control unit 50 (see FIG. 2) that controls each part (see below). The control unit 50 also implements a random number generator (RNG) that is used during operation of the game. Returning to FIGS. 1A and 1B, the display unit 22 includes a first display area 22A and a second display area 22B.

In one embodiment, the first display area 22A and the second display area 22B may be implemented by a display device, such as liquid crystal display devices and organic EL display devices and the like, and by controlling via each control unit 50, the game screens mentioned below functions as the display unit 22 provided to the player. Alternatively, the second display area 22B may be implemented using a number of mechanical reels (see below).

Speaker(s) 30 are provided on the cabinet 20, and by controlling via the control unit 50 through a sound amp 85 (see FIG. 2), sound is provided to the player. On the control panel 26, a bill/ticket identification unit 32, the printer unit 34, and an operation unit 36 are provided.

In the illustrated embodiment, the player tracking unit 57 is housed on the center of the front surface of the cabinet 20. The player tracking unit has a card reader that recognizes a player identification card, a display that presents data to the player, and a keypad that receives input by the player. This type of player tracking unit reads information recorded on the player identification card inserted by the player into the card reader, and displays the information and/or information acquired by communicating with the external system on the display, by cooperatively operating with the control unit 50 mentioned below, or an external system. Further, input from the player is received by the keypad, the display of the display is changed according to the input, and communication with the external system is carried out as necessary.

The bill/ticket identification unit 32 is disposed on the control panel 26 in a state where the insertion opening that a bill or ticket is inserted into is exposed, an identification part that identifies a bill/ticket by various sensors on the inside of the insertion opening is provided, and a bill/ticket storage part is provided on the outgoing side of the identification part. The bill/ticket identification unit 32, receives and identifies bills and tickets (including vouchers and coupons) that are the game value as a game executing value, and notifies the control unit 50 mentioned below.

The printer unit 34 is disposed on the control panel 26 in a state where the ticket output opening that a ticket is output from is exposed, a printing part that prints predetermined information on a printing paper on the inside of the ticket output opening is provided, and a housing part that houses the printing paper inside the paper inlet side of the printing part is provided. The printer unit 34, under the control of the control unit 50 mentioned below, prints information on paper and outputs a ticket according to credit payout processing from the gaming machine 10. The output ticket can use the payout credit as game play by being inserted into the bill/ticket identification unit of another gaming machine, or, can be exchanged for cash by a kiosk terminal inside of the casino or a casino cage.

The operation unit 36 receives the operation of the player. The operation unit 36 includes a group of setting buttons 38 that receives various instructions from the player on the gaming machine 10. The operation unit 36, for example, may include a spin button and a group of setting buttons. The spin button receives an instruction to start (start rotating the reel) the game listed below. The group of setting buttons 38 includes a group of bet buttons, a group of line-designation buttons, a max bet button, and a payout button and the like. The group of bet buttons receives an instruction operation regarding the bet amount of credits (bet number) from the player. The group of line-designation buttons receives an instruction operation that designates a pay line (referred to as an effective line below) subjected to a line judgment below from the player. The max bet button receives an instruction operation regarding the bet of the maximum amount of credits that can be bet at one time from the player. The payout button receives an instruction operation instructing a credit payout accumulated in the gaming machine 10.

Figure 2:
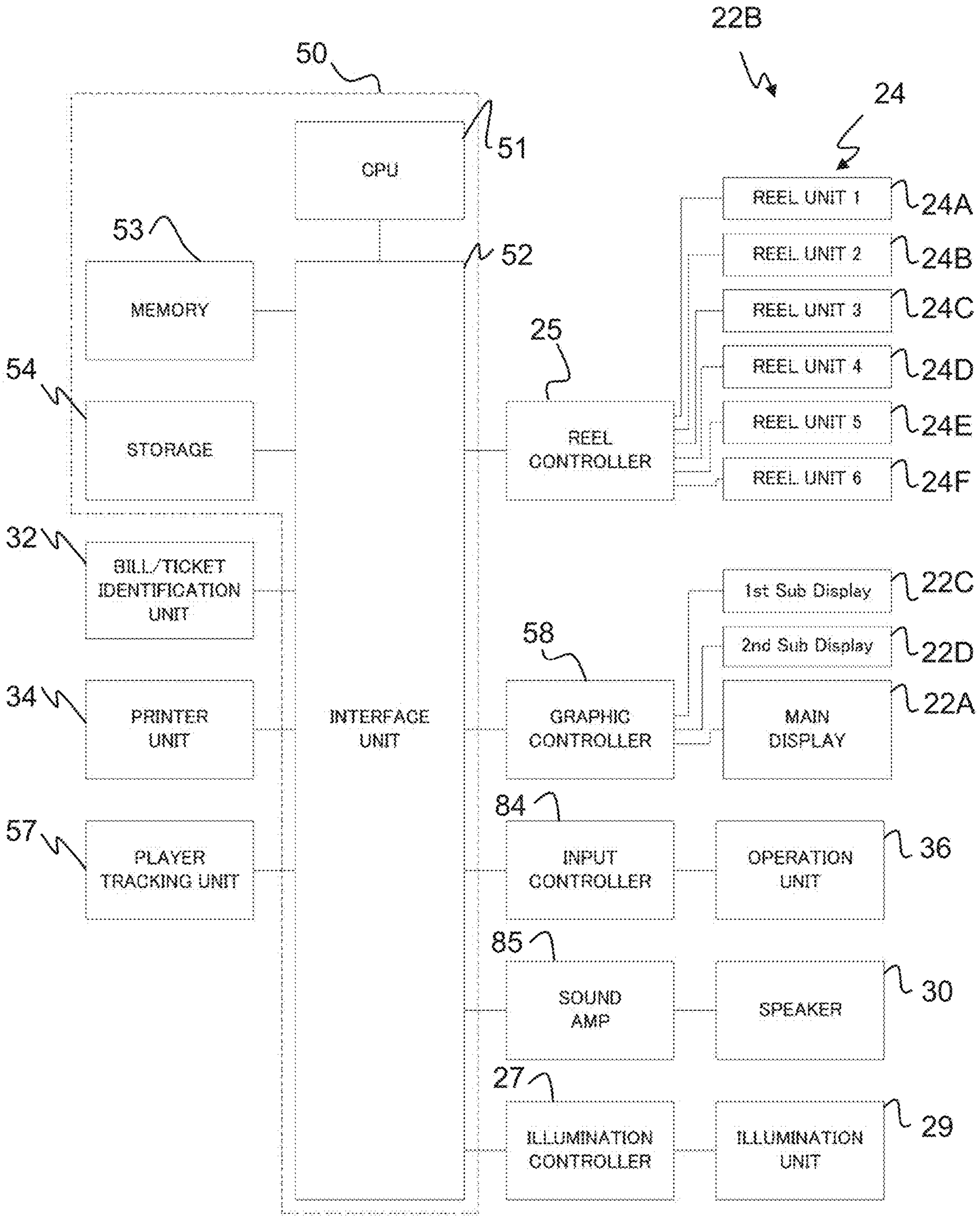
FIG. 2 is a functional block diagram of the gaming machine in FIG. 1.

With reference to FIG. 2, further on the inside of the cabinet 20, a control board equipped with a central processing unit 51 (abbreviated as CPU below) that configures the control unit 50, an interface unit (or part) 52, a memory 53 and a storage 54 and the like are incorporated. The control board is configured so that communication is possible through the interface unit 52 and each of the components equipped on the cabinet 20, controls the operation of each part by executing the program recorded in the memory 53 or the storage 54 of the CPU 51, and provides a game to the player.

FIG. 2 shows a functional block diagram of the gaming machine 10, according to the present embodiment. The gaming machine 10 provides the control unit 50. The control unit 50 is configured as the interface unit 52, including a chip set providing communication functions of the CPU 51, a memory bus connected to a CPU, various expanding buses, serial interfaces, USB interfaces, Ethernet (registered trademark) interfaces and the like, and a computer unit where the CPU 51 provides the addressable memory 53 and the storage 54 through the interface unit 52. The memory 53 can be configured to include RAM that is a volatile storage medium, ROM that is a nonvolatile storage medium, and EEPROM that is a rewritable nonvolatile storage medium. The storage 54 provides the control unit 50 as an external storage device function, can use reading devices such as a memory card that is a removable storage medium, and a magneto optical disk and the like, and can use hard disks.

On the interface unit 52, in addition to the CPU 51, the memory 53, and the storage 54, the bill/ticket identification unit 32, the printer unit 34, the player tracking unit 57, a graphic controller 58, an input controller 84, and a sound amp 85 are connected. That is, the control unit 50 is connected to the operation unit 36 through the input controller 84, and connected to the first display area (or main display) 22A through the graphic controller 58.

As discussed above, the second display area 22B may also be implemented in a video display (not shown). The video display that implements the second display area 22B may also be controlled by the CPU 51 through a graphic controller 58.

Figure 1C:
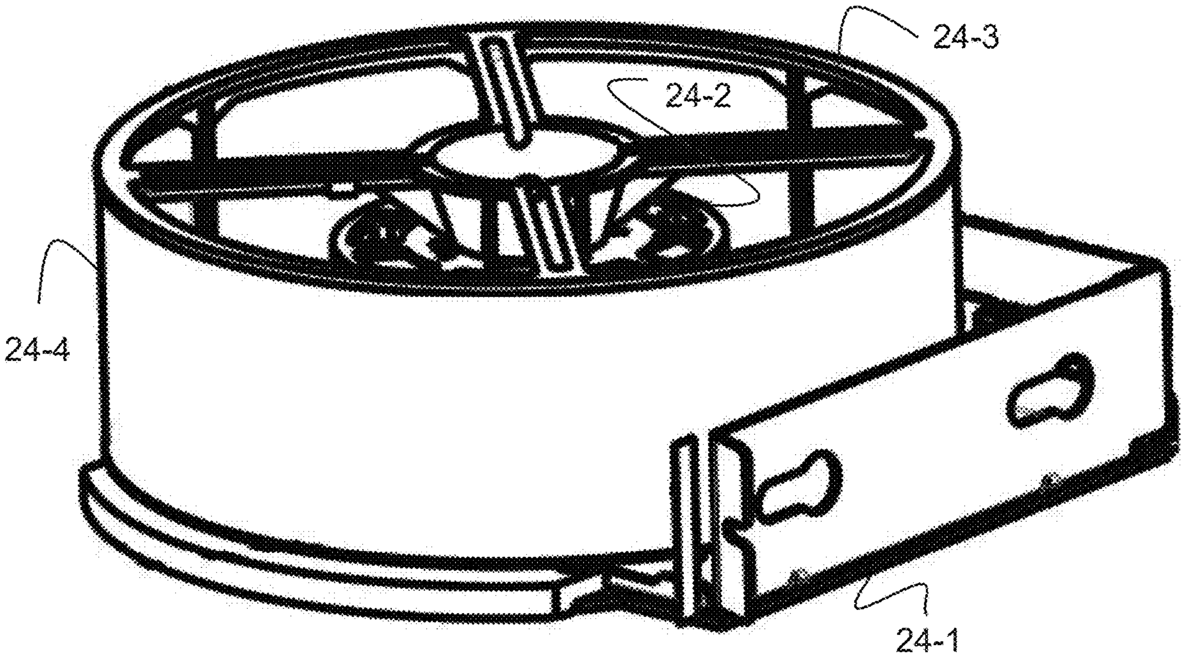
FIG. 1C is a perspective view of a mechanical reel unit of the gaming machine of FIG. 1, according to an embodiment of the present invention.

Alternatively, the second display area 22B may include a plurality of mechanical reel units 24. As shown in FIGS. 1A, 1B, and 1C, in the illustrated embodiment, the mechanical reel units 24 present horizontal reels to the player. With specific reference to FIG. 1C, each reel unit 24 includes a base frame 24-1 for mounting the reel unit 24 to the cabinet 20 of the gaming machine 10. A stepper motor 24-2 is mounted to the base frame 24-1. A rotating frame 24-3 is mounted to the stepper motor 24-2. A reel strip 24-4 is mounted to an outer surface of the rotating frame 24-3. The reel units 24A-24F are controlled by the control unit 50 via a stepper motor or reel controller 25.

As explained in more detail below, the second display area 22B may be used during a bonus game or a feature of a main game provided to the player of the gaming machine 10.

Returning to FIGS. 1 and 2, the gaming machine 10 may also include first and second sub display units 22C, 22D that are used to provide additional information to the player. The first and second sub display units 22C, 22D may also be controlled through the graphic controller 58.

Further, additional illumination or decorative lighting for the gaming machine 10 may be provided by illumination unit 29 controlled by the control unit 50 through an illumination controller 27.

The control unit 50, which includes memory 53 and storage 54, controls each part by executing a program stored in the memory 53 and the storage 54, and provides a game to the player. Here, for example, the memory 53 and storage 54 may be configured to store a program and data of an operating system and subsystem that provide the basic functions of the control unit 50 to the EEPROM of the memory 53, and stores a program and data of an application that provides a game to the storage 54. According to such a configuration, it can be easy to change or update a game by replacing the storage 54. Further, the control unit 50 may be a multiprocessor configuration that has a plurality of CPUs.

Each block connected to the control unit 50 is described below. The bill/ticket identification unit 32 receives bills or tickets in the insertion opening, and notifies the control unit 50 of identifying information corresponding to the assortment of bills, or the payout processing of credits. The bill/ticket identification unit 32 notifies the information to the control unit 50, and the control unit 50 increases the usable credit amount inside of the game according to the notified content. The printer unit 34 is under the control of the control unit 50 which receives an operation of the payout button of the group of setting buttons 38 and prints information corresponding to the credit payout processing from the gaming machine 10 on a printed ticket.

The player ranking (or tracking unit) unit 57 cooperatively operates with the control unit 50, and sends and receives information and the like of the player from the casino management system. The graphic controller 58 controls the main display or first display area 22A, as well as the first and second sub display 22C, 22D under the control of the control unit 50, and displays a display image that includes various graphic data. The sound amp 85 drives the speaker 30 under the control of the control unit 50, and provides various sounds such as an announcement, sound effects, BGM and the like.

Further, the interface unit 52, has various communication interfaces for communicating with the exterior of the gaming machine 10, for example, the interface unit 52 can communicate with an external network by Ethernet and a serial output. In the present embodiment, one example shows when there is communication between a well-known server side gaming network, a G2S network, and a slot information system, respectively.

Figure 3:
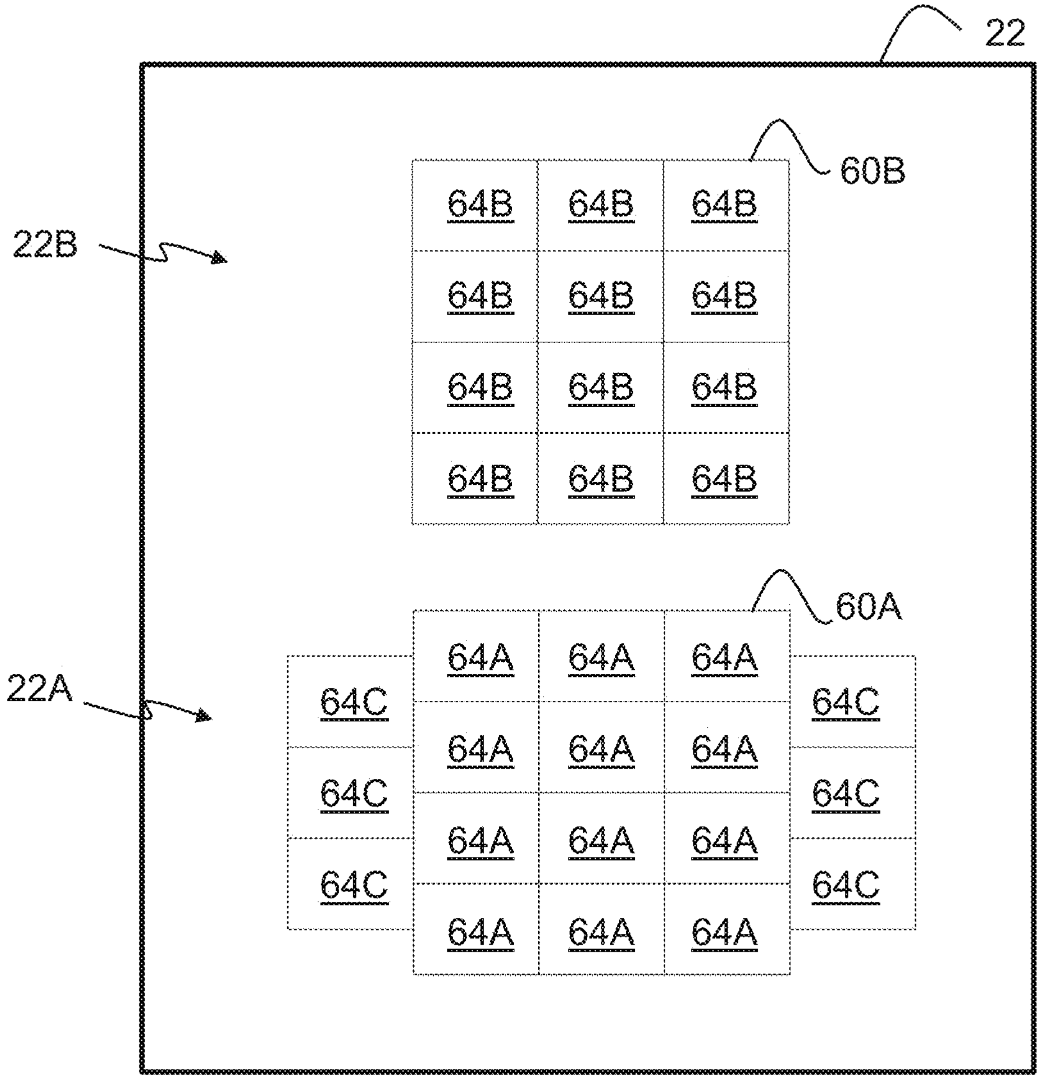
FIG. 3 is a diagrammatic illustration of a display area, including a first display area and a second display area, of the gaming machine in FIG. 1, according to an embodiment of the present invention.

FIG. 3 is a figure schematically showing a representation of the game provided by the gaming machine 10, according to the present embodiment. The game presents a first grid 60A and a second grid 60B to the player in the first and second display areas 22A, 22B, respectively. The first grid 60A includes a plurality of cells 64A arranged in a plurality of rows and a plurality of columns. The second grid 60B includes a plurality of cells 64B arranged in a plurality of rows and a plurality of columns. Each cell 64B of the second grid 60B is associated with one of the cells 64A of the second grid 60A.

In the illustrated embodiment, the second grid 60B includes 4 rows and 3 columns as shown. In one embodiment, the first grid 60A includes the same number of cells 64A as the second grid 60B arranged in the same number of rows and columns. Each cell 64B of the second grid 60B corresponds to the cell 64A in the same row and column of the first grid 60A.

In one embodiment, the first grid 60A may include an additional plurality of cells 64C. The additional plurality of cells may be arranged into additional row(s) and/or additional column(s). The cells in the additional plurality of cells 64C are not associated with one of the cells 64B in the second plurality of cells.

Figure 5A:
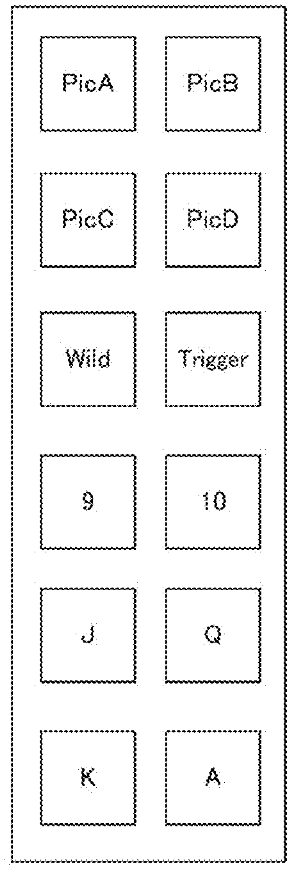
FIG. 5A is a diagram illustrating types of symbols displayed in one of the symbol display regions, according to an embodiment of the present invention.

The control unit 50, during the main game and/or a bonus game or feature, randomly selects a first plurality of symbols associated with the first symbol display area 22A. Each symbol in the first set of symbols is associated with one of the plurality of cells 64A in the first grid 60A. The symbols in the first plurality of symbols are selected from a first set of symbols. An example of a first set of symbols is shown in FIG. 5A.

The control unit 50 randomly selects a second plurality of symbols being associated with the second symbol display area 22B. Each symbol in the second set of symbols is associated with one of the plurality of cells 64B in the second grid 60B. The symbols in the second plurality of symbols are selected from a second set of symbols. The second set of symbols includes a null symbol and at least one non-null symbol. The non-null symbol(s) and the null symbol(s) in the second plurality of symbols form a bonus pattern of symbols. The control unit 50 copies the bonus pattern of symbols from the second grid 60B to the first grid 60A. The bonus pattern of symbols and any remaining symbols from the first plurality of symbols in the first grid 60A form a second outcome. The control unit 50 awards a payout to the player as a function of the second outcome, a wager, and a pay table. A payout may optionally be awarded based on the initial outcome.

Figure 5B:
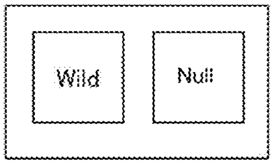
FIG. 5B is a diagram illustrating types of symbols displayed in another one of the symbol display regions, according to an embodiment of the present invention.

An example of the second set of symbols is shown in FIG. 5B. A null symbol is a blank symbol and results in the original symbol, i.e., the symbol from the first plurality of symbols, being included and shown in the second outcome. Any non-null symbol in the bonus pattern of symbols replaces or is displayed over the corresponding symbol in the associated cell 64A of the first grid 60A (after the bonus pattern of symbols is copied to the first grid 60A).

In the illustrated embodiment, the second set of symbols incudes a Wild symbol and a null symbol. In an alternative embodiment, the second set of symbols includes a plurality of non-null symbols which may include some or all of the symbols in the first set of symbols and/or additional symbol(s).

The game shown in FIG. 3 may be displayed at least partially on a video display screen by the control unit 50 executing a predetermined program. The display unit 22 includes the first display area 22A and the second display area 22B. In one embodiment, the display unit 22 is embodied in a single display (not shown). In this embodiment, the second display area includes a plurality of horizontal video reels (see below).

In another embodiment, the first display area 22A is embodied in a video display and the second display area 22B is implemented by a plurality of horizontal mechanical reel units 24.

In one aspect of the present invention, the gaming machine 10 provides a game to the player. The game may include a primary game and a bonus game. For instance, the primary game may be a video slot game, and the bonus game may be the awarding of a number of free games or spins in response to the occurrence of a trigger condition, e.g., during the primary game. During either the primary game or the bonus game, in response to a predetermined trigger, the bonus pattern of symbols is established and displayed in the second grid 60B and then copied to the first grid 60A.

The establishment, display and copying of the bonus pattern may be performed prior, during, or after the establishment and display of the initial outcome. In one embodiment, the initial outcome may not be fully displayed since the bonus pattern may be copied prior to the fully initial outcome being displayed.

Figure 4:
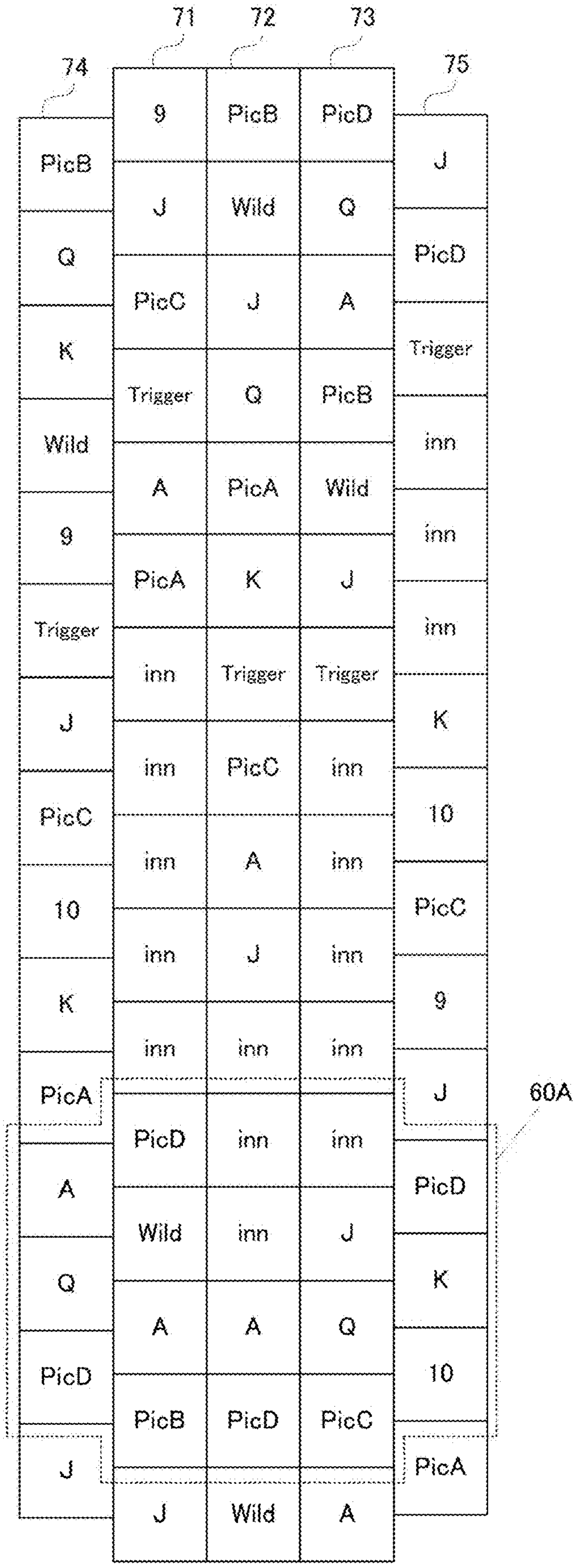
FIG. 4 is an illustration showing one example of a symbol arrangement showing the order of symbols displayed on the first display area in FIG. 3.

With reference to FIG. 4, the first grid 60A (which includes the first plurality of cells 64A and the additional plurality of cells 64C) is displayed in the first display area 22A. Further, the first display area 22A can display a decorative area, and an area that displays credit amount, bet number, and a credit amount obtained by winning (WIN number) and the like, outside of the determination area 60 (see FIG. 7). On each of the plurality of cells 64A of the first grid 60A, one symbol is stopped and displayed.

On each cell 64A of the first grid 60A, as shown in FIG. 4, a symbol is displayed based on the symbol arrangement of virtual reel strips 71 to 75 configured of a virtual reel set 70. The cells 64 of the display area 60 correspond to the virtual reel strips 71 to 75 by column, and the symbols disposed on predetermined parts of each virtual reel strip 71 to 75 are displayed. Furthermore, as mentioned below, by moving (scrolling or spinning) each symbol by column based on the symbol arrangement of the virtual reel strips 71 to 75, the symbols displayed in the cells 64 of the determination area 60 change, and by stopping the movement (scrolling or spinning) by columns, the symbols are stopped. Here, the virtual reel strips 71 to 75 are data where the control unit 50 uses a program having the memory 53 or the storage 54, and data showing the symbol arrangement (i.e., the order of symbols on each reel) regulated by each cell column. Further, the virtual reel set 70 is a general term for such virtual reel strips 71 to 75.

As shown, the additional cells 64C may be arranged in columns. Each column of additional cells 64C may have an associated reel strip 75, 77.

Each virtual reel strip 71-75, in an example of FIG. 4, is configured by a predefined number, e.g., 15 or 16, symbols, and those symbols are aligned in an order defined by each reel. FIG. 5A illustrated the details of symbols of the figure shown in FIG. 4. Each virtual reel strip 71 to 75 includes symbols selected from a symbol set of 12 varieties shown in FIG. 5A. This symbol set includes card symbols ("9", "10", "J", "Q", "K", and "A") that imitate playing cards as regular symbols, and picture symbols ("PicA", "PicB", "PicC", and "PicD") that show a pattern. Further, this symbol set includes a wild symbol ("Wild") that is substituted as another symbol when a win is determined and a trigger or symbol ("Trig") that is used to determine if a feature or feature game is to be played (see below). Each of these symbols have a different rank from each other regarding their value when winning, their rank gradually raises in this order: "9", "10", "J", "Q", "K", "A", "PIC-d", "PIC-c", "PIC-b", "PIC-a". A combination of symbols that includes high-ranking symbols when winning, can obtain a larger winning payout compared to a combination of low-ranking symbols when winning. Further, each virtual reel strip 71 to 75 may include one or more variable symbols ("inn") that are transformed into one of the other symbols (see FIG. 5A) for each game or spin.

The control unit 50 starts a game, determines the stop position of each virtual reel strip 71-75 randomly, the virtual reel strips 71 to 75 move from a current position, and the operation to stop on a stop position. Due to this, in the display or determination area 60, the symbols included on the virtual reel strips 71-75 are continuously moved (scrolled or spun) in the vertical direction of the first display area 22A, and one symbol of one cell 64A, 64C aligned in an order of the symbol based on the symbol arrangement is stopped so that it is displayed.

The control unit 50 changes and stops the plurality of symbols displayed on the display unit 22 according to the operation of the player received by the operation unit 36, and a payout may be paid according to the stopped symbols inside the first grid 60A as a function of the symbols, one or more played pay lines and a pay table as is known in the art.

In the first display area 22A, a pay line is set that is used when winning is determined. The pay line is set to be extended over the column on the right end from the cells of the column of the left end, and is a line that combines the plurality of cells 64A, 64C determining a win. The number of effective lines within the set pay line is selected by the operation of a group of line designation buttons included in the group of setting buttons 38 of the operation unit 36 for the player. The control unit 50, in regards to the result of a game that is a combination of symbols, determines a win when a predetermined number of identical symbols is surpassed and aligned on a set pay line, and pays a payout to the player according to the type and number of symbols. On the gaming machine 10 of the present embodiment, a predetermined number of pay lines in the first display area 22A is set. The system for determining a win may determine a win when a predetermined number of identical symbols from cells of the column on the left end are aligned on a set pay line, may determine a win when a predetermined number of identical symbols from cells of the column on the right end are aligned on a set pay line, and may determine a win when a predetermined number of identical symbols are aligned on a continuous column on a predetermined pay line.

It should be noted that any combination or set of pay lines shown may be used. In general, the pay lines start in the first column and end in the last column, and include one cell per column. However, one or more pay lines could include one or more cells in the same column and may include a vertical pay line.

The gaming machine 10 of the present embodiment may provide two types of games: a primary game (also referred to as a main game), and a special game (referred to as a bonus game, or feature game, and includes providing one or more free games or spins that do not consume game value) provided when predetermined conditions are satisfied. Concerning a primary game and a feature game, the symbols displayed in the first display area 22A configure a combination of symbols that are the result of a game, and determine a win.

Figure 6:
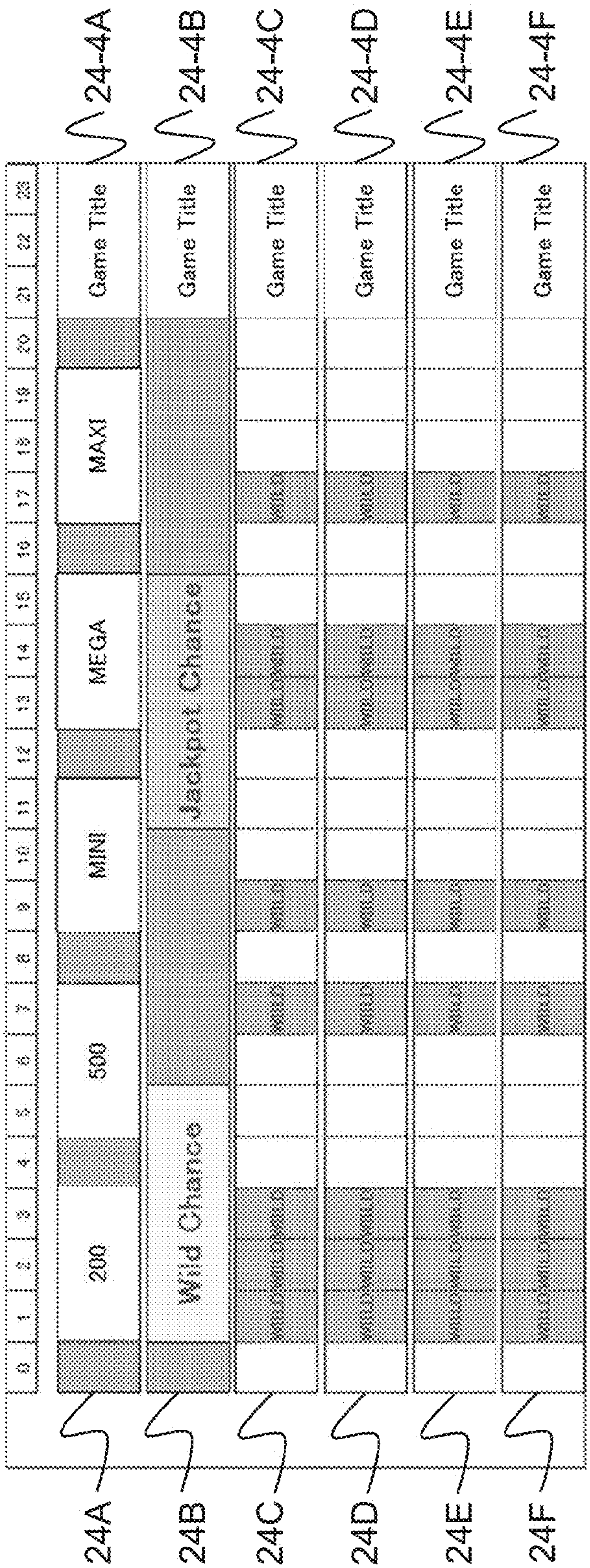
FIG. 6 is an illustration showing one example of a symbol arrangement showing the order of symbols displayed on the second display area in FIG. 3.

With reference to FIG. 6, as discussed above in one embodiment, the second display area 22B may include a plurality of mechanical reel units 24. In the illustrated embodiment, the second display area 22B includes first, second, third, fourth, fifth, and sixth mechanical reel units 24A, 24B, 24C, 24D, 24E, 24F. Each mechanical reel unit 24A, 24B, 24C, 24D, 24E, 24F has a respective reel strip 24-4A, 24-4B, 24-4C, 24-4D, 24-4E, 24-4F. Each reel strip includes 24 positions (0-23).

The first and second mechanical reel units 24A, 24B are used to provide information regarding a progressive game and/or the bonus game or feature (see below).

The third, fourth, fifth, and sixth mechanical reel units 24C, 24D, 24E, 24F are associated with the second grid 60B. Each of the third, fourth, fifth, and sixth mechanical reel strips 24-4C, 24-4D, 24-4E, 24-4F has one of the symbols from the second set of symbols (see FIG. 5B) printed thereon. In the illustrated embodiment, each symbol location has either a Wild symbol, or a null or blank symbol. As noted above, however, the second set of symbols may include other symbols, as well.

Further, each of the third, fourth, fifth, and sixth reel strips 24-4C, 24-4D, 24-4E, 24-4F is identical in the illustrated embodiment. However, each of the reel strips 24-4C, 24-4D, 24-4E, 24-4F may have a different combination or pattern of symbols from the other reel strips 24-4C, 24-4D, 24-4E, 24-4F. Further, each reel strip may have other symbols or indicia other than the symbols in the second symbol set. For instance in the illustrated embodiment, the reel strips 24-4C, 24-4D, 24-4E, 24-4F include a graphic indicating the name or game title of the game provided by the gaming machine 10. The game title graphic may be displayed during the main game, or at other times specified by the control unit 50.

It should be noted that the present invention is not limited to any specific length of virtual reels, symbols, ranking of symbols and/or pay lines.

Returning to FIGS. 1-3, in one aspect of the present invention, the display unit 22 is operably coupled to the operation unit and configured to display a first symbol display area 22A and a second symbol display area 22B. The first symbol display area 22A including a first plurality of cells 64A is arranged in a first grid 60A. The first grid 60A has a plurality of rows and a plurality of columns. The second symbol display area 22B includes a second plurality of cells 64B arranged in a second grid 60B. The second grid has a plurality of rows and a plurality of columns.

Each cell 64B of the second plurality of cells is associated with one of the cells 64A of the first plurality of cells. For instance, in one embodiment, each cell 64B of the second plurality of cells may be associated with the cell 64A of the first plurality of cells based on the position in the grids. Thus, for example, the cell 64B in the first row, first column of the second grid 60B may be associated with the cell 64A in the first row, first column of the first grid 60A.

The control unit 50 is operably coupled to the operation unit 36 and the display unit 22 and is configured to initiate a game in response to player operation and to establish an outcome of the game. The control unit 50, in response to initiation of the game, randomly selects a first plurality of symbols associated with the first symbol display area 22A. Each symbol in the first set of symbols is associated with one of the plurality of cells 64A in the first grid 60A. The symbols in the first plurality of symbols are selected from a first set of symbols. The first plurality of symbols form an initial outcome of the game. An award may be provided to the player based on the initial outcome and a pay table.

In one embodiment of the present invention, the symbol associated with each cell 64A is randomly determined. In another embodiment of the present invention, each column of the first grid 60A has an associated video reel strip 71-75 (see above). A stop position associated with each video reel strip 71-75 is randomly determined.

The control unit 50 is further configured to randomly select a second plurality of symbols associated with the second symbol display area 22B. Each symbol in the second set of symbols is associated with one of the plurality of cells 64B in the second grid 60B. The symbols in the second plurality of symbols are selected from a second set of symbols (see above). The second set of symbols includes a null symbol and at least one non-null symbol. The null symbol(s) and the non-null symbol(s) in the second plurality of symbols form a bonus pattern of symbols. In one embodiment, the second symbol display area 22B includes a plurality of mechanical reel units 24. In randomly selecting the second plurality of symbols, the control unit 50 may randomly establish a stop position for each mechanical reel unit 24.

Alternatively, the control unit 50 may establish the bonus pattern in a different manner and then automatically select a stop position for each mechanical reel unit 24 to achieve the established bonus pattern.

In one embodiment, each cell 64B of the second grid 60B has a reference number (1-12) and at least one probability associated with the cell 64B. The at least one probability associated with each cell is associated with one of the symbols in the set of symbols from which the selective symbol is selected. For instance, if the set of symbols includes five symbols (including the null symbol), each symbol in the set may have a predetermined probability of being selected. The probability that one symbol may appear in one of the cells 64B may be different than the probability that the same symbol appears on another one of the cells 64B.

In another embodiment, the placement of the replacement symbols are determined utilizing virtual (non-visible) vertical reels 80. The data for the vertical reels are stored in memory. In the illustrated embodiment, each column of the second grid 60B has an associated virtual vertical reel. Each reel may have a weighted stop probability, i.e., one of the stop positions of one of the reels may have a different probability than another one of the stop positions on the one of the reels. The RNG is used to establish a stop position for each virtual vertical reel. Each reel has a pattern of non-null symbol(s) and null symbols. The control unit 50 uses the RNG to determine an independent stop position for each virtual non-visible vertical reel.

In still another embodiment, the control unit 50 establishes the bonus pattern by selecting a predetermined bonus pattern from a set of predetermined bonus patterns. The data for each of the predetermined patterns in the set of patterns are stored in memory. In one embodiment, each predetermined pattern of replacement symbols in the set of predetermined patterns has an equal probability. In another embodiment, each predetermined pattern may have a different probability than another one of the predetermined patterns.

Once the bonus pattern has been established, the control unit 50 selects stop positions for the horizontal mechanical reel units 24 such that the established bonus pattern is formed.

The control unit 50 may further copy the bonus pattern of symbols from the second grid 60B to the first grid 60A. The bonus pattern of symbols and any remaining symbols from the first plurality of symbols in the first grid 60A form a second outcome. The control unit 50 may provide a payout to the player as a function of the second outcome, a pay table and a wager.

As shown in FIG. 3, the first grid 60A may also include an additional plurality of cells 64C. The additional plurality of cells 64C may be arranged into additional row(s) or an additional column(s). In the illustrated embodiment, the additional plurality of cells 64C are arranged into columns having a number of rows less than the number of rows in the other columns.

In one embodiment of the present invention, the cells 64C in the additional plurality of cells are not associated with one of the cells 64B in the second plurality of cells.

The symbols from which the symbols in the second set of symbols may be the same or different than the symbols from the symbols in the first set of symbols. However, if the symbols are different, the second set of symbols may also include some of the same symbols as the symbols from which the symbols in the first set of symbols are selected. In the illustrated embodiment, the symbols from which the second set of symbols is selected includes a Wild symbol and a null symbol.

In one embodiment of the present invention, the control unit 50 detects a trigger or triggering condition and randomly selects the second plurality of symbols and copies the bonus pattern of symbols to the first grid 60A in response to detecting the triggering condition. The trigger or triggering condition may be any suitable condition or set of conditions that may occur in the game, or occur independent of the game, e.g., from an outside source such as a player tracking system. For instance, the trigger condition may be defined as the appearance of a predetermined number of trigger symbols in an outcome of the game. The trigger condition may be a mystery trigger event, i.e., an event which may be related to the main game, but is not visible or part of, or shown within the outcome of the game.

In one embodiment, the control unit 50 awards an initial award as a function of the initial outcome. In another embodiment, the control unit 50 only awards an initial award as a function of the outcome of the game, i.e., the bonus pattern of symbols and any remaining symbols from the first plurality of symbols.

In one embodiment, the control unit 50 is configured to display the first plurality of symbols in the first grid 60A prior to copying the bonus pattern of symbols from the second grid 60B to the first grid 60A.

As discussed above, in one embodiment the main game is a video slot game and the cells 64A in the first grid 60A are arranged into a plurality of rows and a plurality of columns. Each column of the first grid 60A defines a reel of the video slot game. The control unit 50 is configured to display the first plurality of symbols in the cells of the first grid in a manner to simulate vertical rotating reels. The cells 64B in the second grid 60B may be arranged into a plurality of rows and a plurality of columns. Each row may define a horizontal reel. As described above, each horizontal reel of the second grid may be implemented using a mechanical reel unit 24.

Alternatively, each horizontal reel may be a virtual reel. The control unit 50 may be configured to display the second plurality of symbols in the cells 64B of the second grid 60B in a manner to simulate horizontal rotation reels.

In one embodiment of the present invention, the control unit 50 is configured to copy the bonus pattern of symbols from the second grid 60B to the first grid 60A, while the simulated vertical rotating reels are spinning. In another embodiment of the present invention, the control unit 50 is configured to copy the bonus pattern of symbols from the second grid 60B to the first grid 60A after the simulated vertical rotating reels stop spinning. In still another embodiment of the present invention, the control unit 50 is configured to copy the bonus pattern of symbols from the second grid 60B to the first grid 50A before the simulated vertical rotating reels start spinning.

Figure 7:
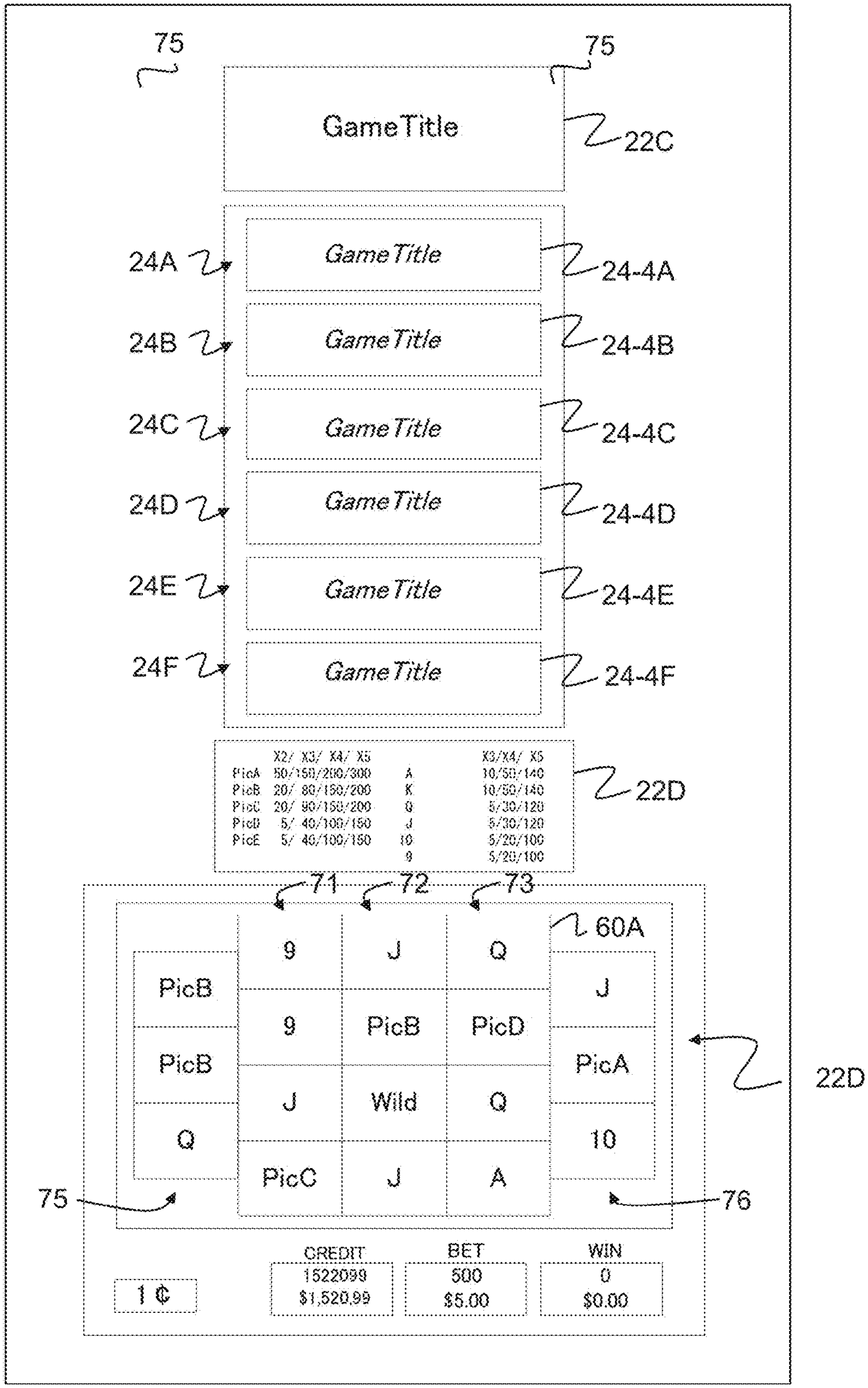
FIG. 7 is a diagram illustrating the first and second display areas of FIG. 3, according to an embodiment of the present invention.

With particular reference to FIGS. 7 and 8A-8K, a first embodiment of the present invention will be discussed. As mentioned above, the present invention may provide a main game and a bonus game. The main game or the bonus game may be a video slot game, and may be played on a primary determination area or grid 60. As shown in FIG. 7, in the first embodiment, a first grid 60A composed of a first plurality of cells 64A and a third plurality of cells 64C may be used. The first plurality of cells 64A form a 4×3 sub-grid, while the third plurality of cells form a column on the left side of the sub-grid and a column on the right side of the sub-grid, as shown. In one embodiment, the game or main game may be played or provided by the control unit 50 until a trigger condition has been met. For instance, in one embodiment, the trigger condition may be defined as the appearance of a predetermined number of trigger symbols ("Trig") in an outcome of the game. It should be noted that the trigger condition may be any suitable condition or set of conditions that may occur in the game, or occur independent of the game, e.g., from an outside source such as a player tracking system. The trigger condition may be a mystery trigger event, i.e., an event which while related to the main game, is not visible or part of, or shown within the outcome of the game. Once the trigger condition has been met, the bonus game or feature may be provided.

As shown in FIG. 7, during the main game, the second display area 22B is not used. The first sub-display 22C displays the title of the game. Additionally, each of the first through sixth reel units 24A, 24B, 24C, 24D, 24E, 24F are arranged by the control unit 50 via the reel controller 25 to display the game title. The current pay table is displayed in the second sub-display 22D.

In one embodiment, the bonus pattern of symbols may be provided as a feature of the main game. For instance, during the main game, if a trigger condition is detected, the player may be awarded a number of free games or spins. For each of the free spins, a bonus pattern of symbols is established in the second display area 22B and copied to the first display area 22A to modify or enhance the outcome in the first display area 22A. Alternatively, for every free spin, there is an opportunity for a bonus pattern of symbols to be established. In other words, the bonus pattern of symbols may or may not be established and/or used.

In another embodiment, there is an opportunity in every spin of the main game for the bonus pattern of symbols to be established and used.

With specific reference to FIGS. 8A-8K, a feature utilizing the operation unit 36 is configured to receive an operation of a player. The display unit 22 is operably coupled to the operation unit 36 and is configured to display the first grid 60A in the first display area 22A. As discussed above, the first grid 60A includes a plurality of cells 64A, 64C.

The control unit 50 is operably coupled to the operation unit 36 and the display unit 22, and is configured to initiate a game in response to player operation and to establish an outcome of the game. In response to the game being initiated, the control unit 50 randomly establishes, using the RNG, a first set of symbols associated with the first display area 22A. Each symbol in the first set of symbols is associated with one of the plurality of cells in the group.

Figure 8A:
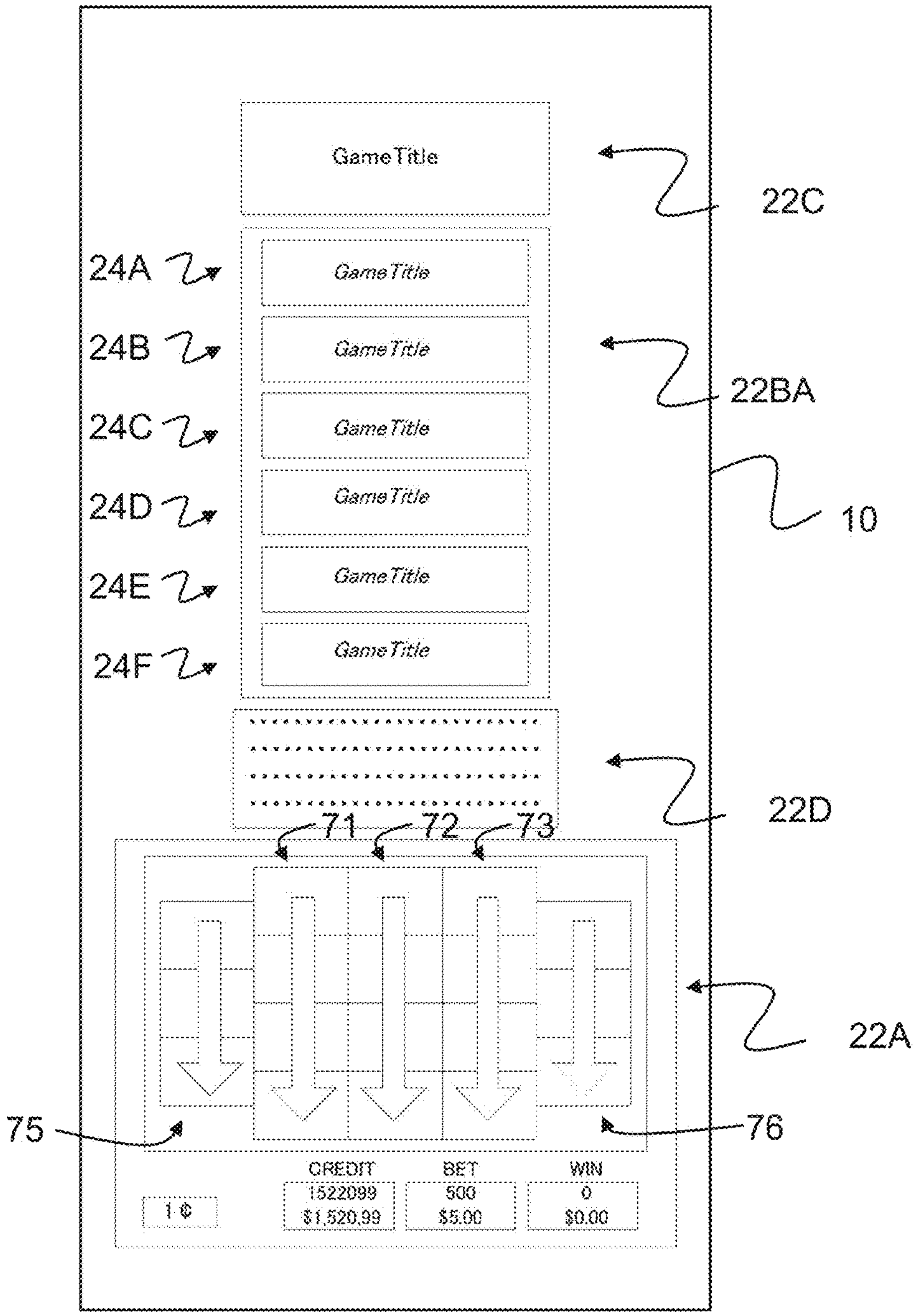
FIGS. 8A-8K are diagrammatic illustrations of the display area of the gaming machine in FIG. 1 during a game, according to an embodiment of the present invention.

As shown in FIG. 8A, once the game is initiated, the main reels 71-75 start spinning and the game progress is displayed in the first display area 22A.

Figure 8B:
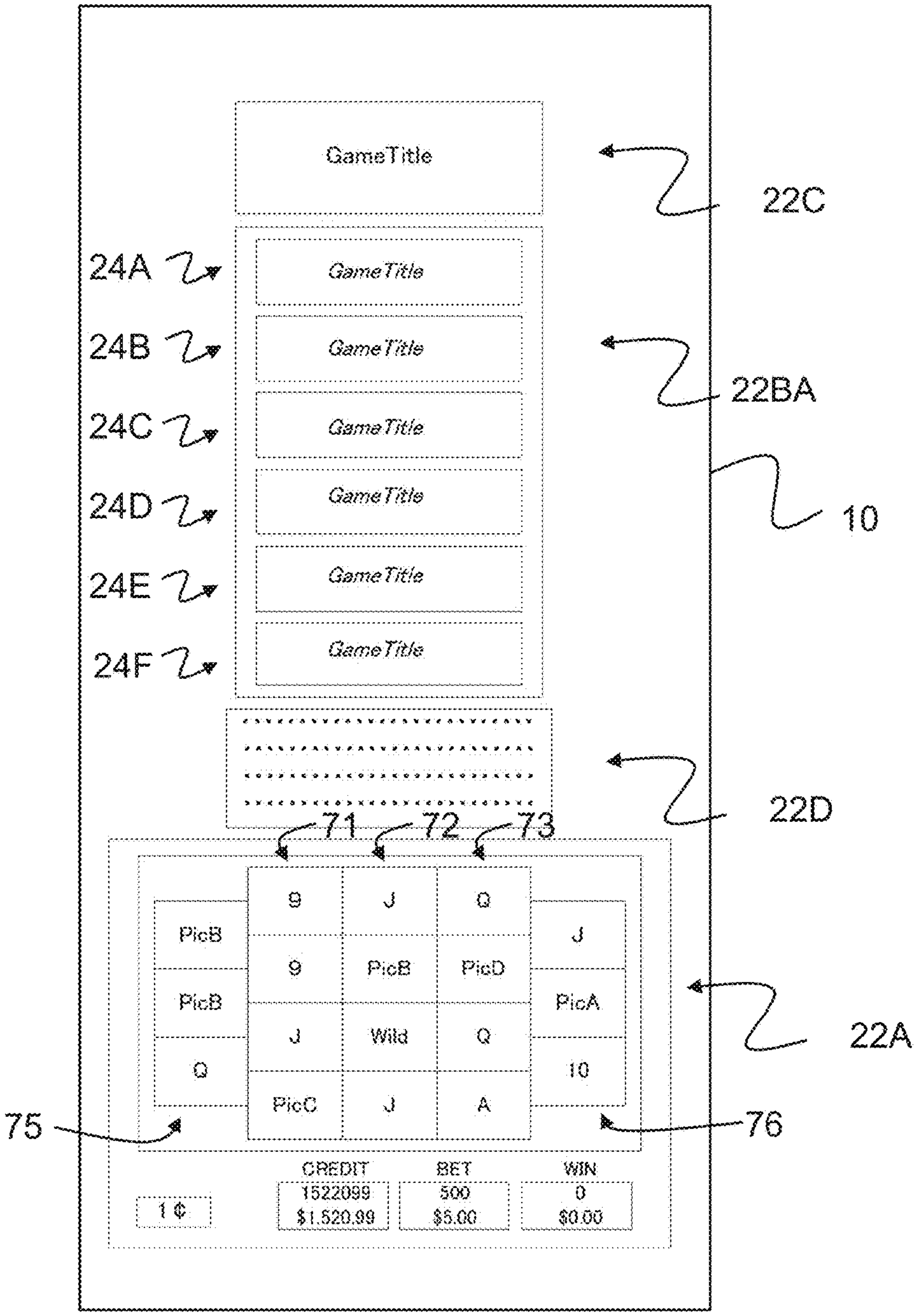

As shown in FIG. 8B, the control unit 50 displays the main reels 71-75 to stop spinning and to display the first set of symbols. If the bonus game or the feature has not been triggered, the first set of symbols is evaluated to determine if a winning condition exists. If a winning condition exists, the player is awarded an award or payout and the game ends.

If a trigger condition is detected, then the feature is initiated. As discussed above, the bonus or feature may be initiated: (1) before the main reels 71-75 start spinning, while the main reels 71-75 are still spinning, or (3) after the main reels 71-75 stop spinning. In the illustrated embodiment, the feature is initiated while the main reels 71-75 are spinning.

Figure 8C:
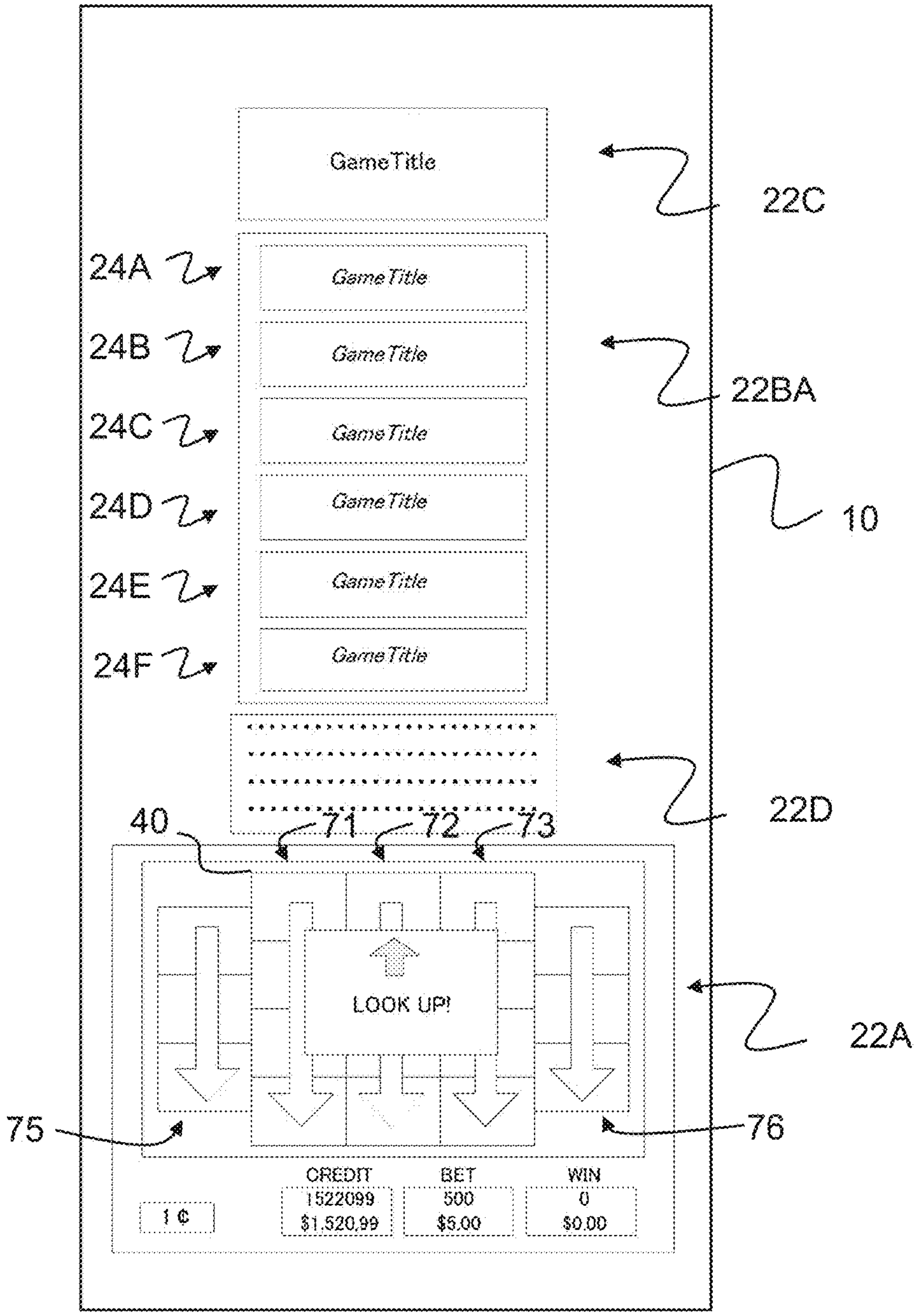

As shown in FIG. 8C, if the control unit 50 detects the triggering condition a graphic 40 is displayed in the foreground of the first display area 22A indicating to the player that the feature has been triggered and to look at the second display area 22B. As shown, the graphic 40 may be displayed while the reels 71-75 are still spinning in the main game.

Figure 8D:
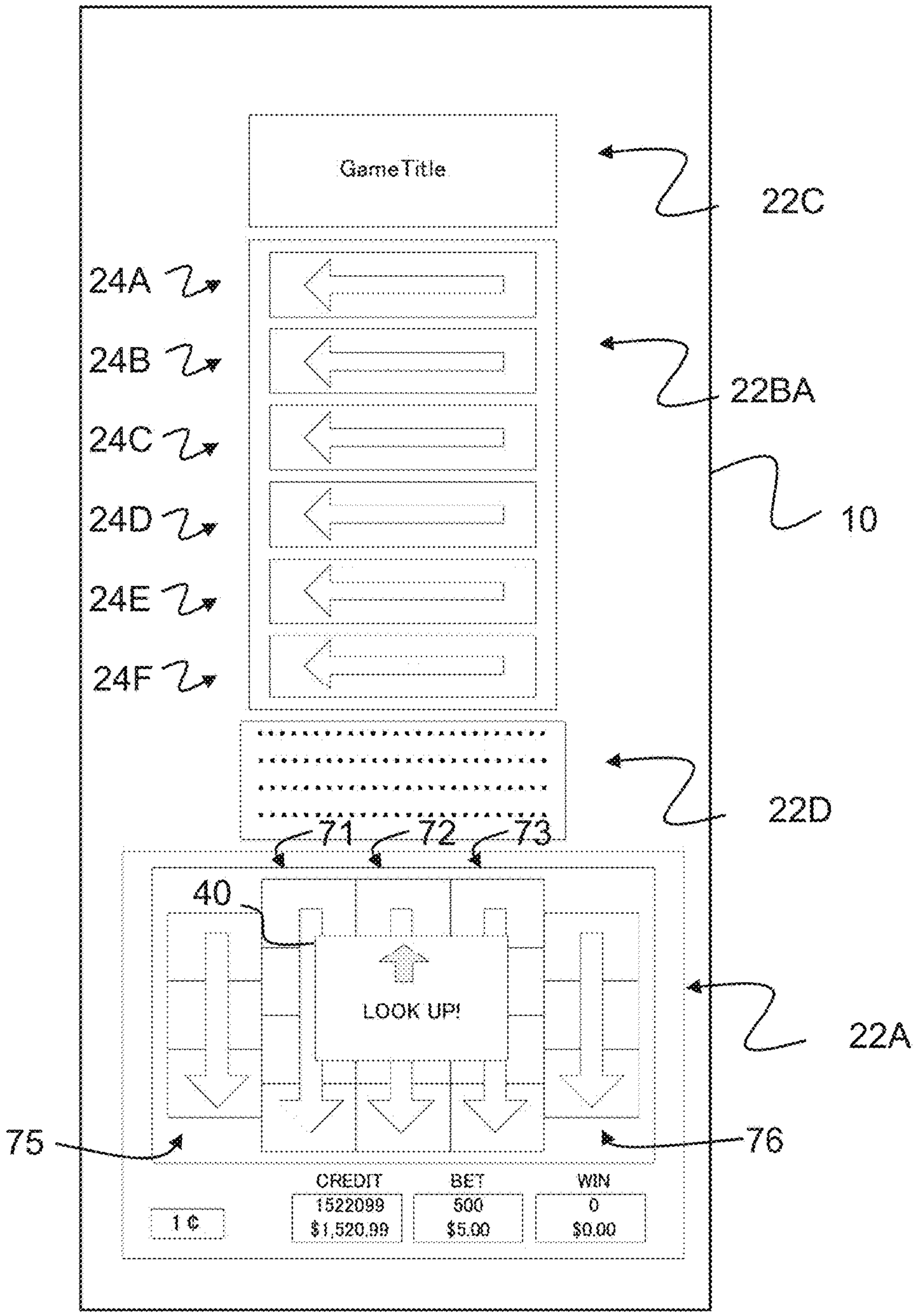

After the graphic 40 is displayed, the control unit 50 starts to spin the first through sixth reel units 24A, 24B, 24C, 24D, 24E, 24F via the reel controller 25 as shown in FIG. 8D.

Figure 8E:
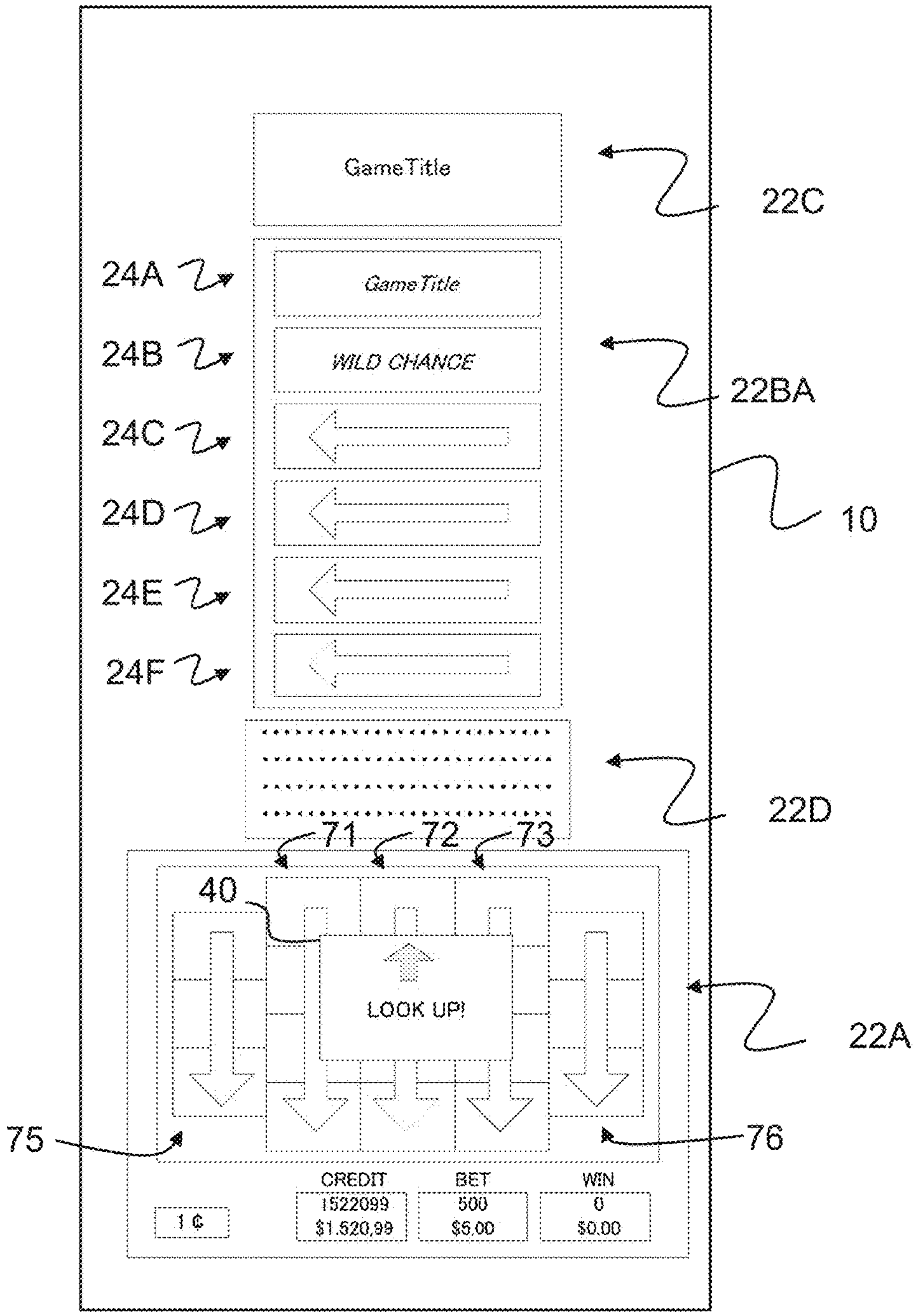

As explained in further detail below, in this embodiment, the player may have an opportunity for the bonus pattern to be established and copied to the first grid 60A and an opportunity to win a progressive award. In this embodiment, the bonus pattern feature may be called "Wild Chance". With reference to FIG. 8E, the control unit 50 stops the spinning of the first reel unit 24A to display Game Title. The control unit 50 stops the second reel unit 24B to display "Wild Chance" to indicate that the feature has been activated.

Figure 8F:
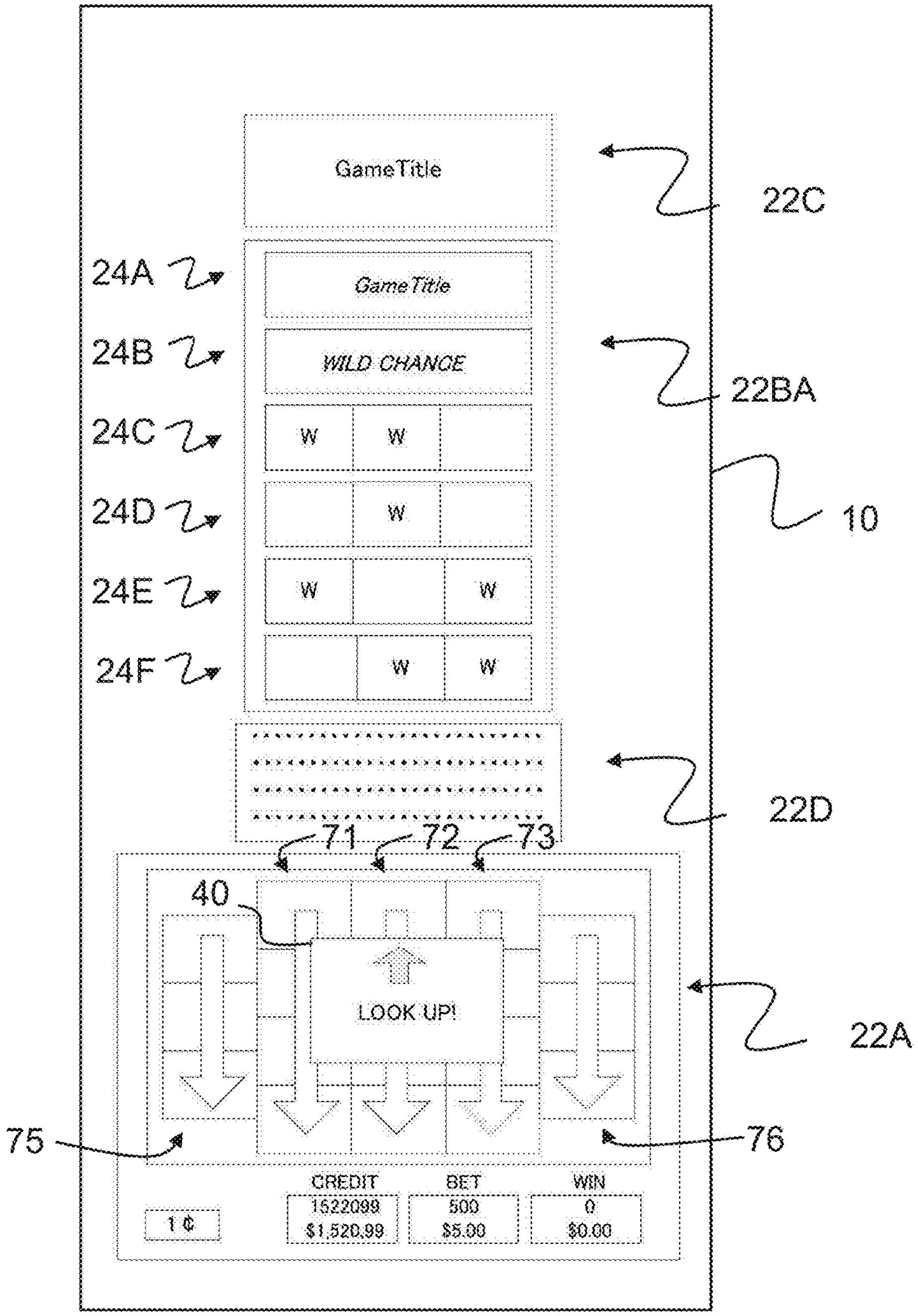

With reference to FIG. 8F, the control unit 50 then stops the third through sixth reel units 24C, 24D, 24E, 24F at randomly determined stop positions to display a bonus pattern. In this embodiment, the bonus pattern is composed of "Wild" symbols and null symbols.

Figure 8G:
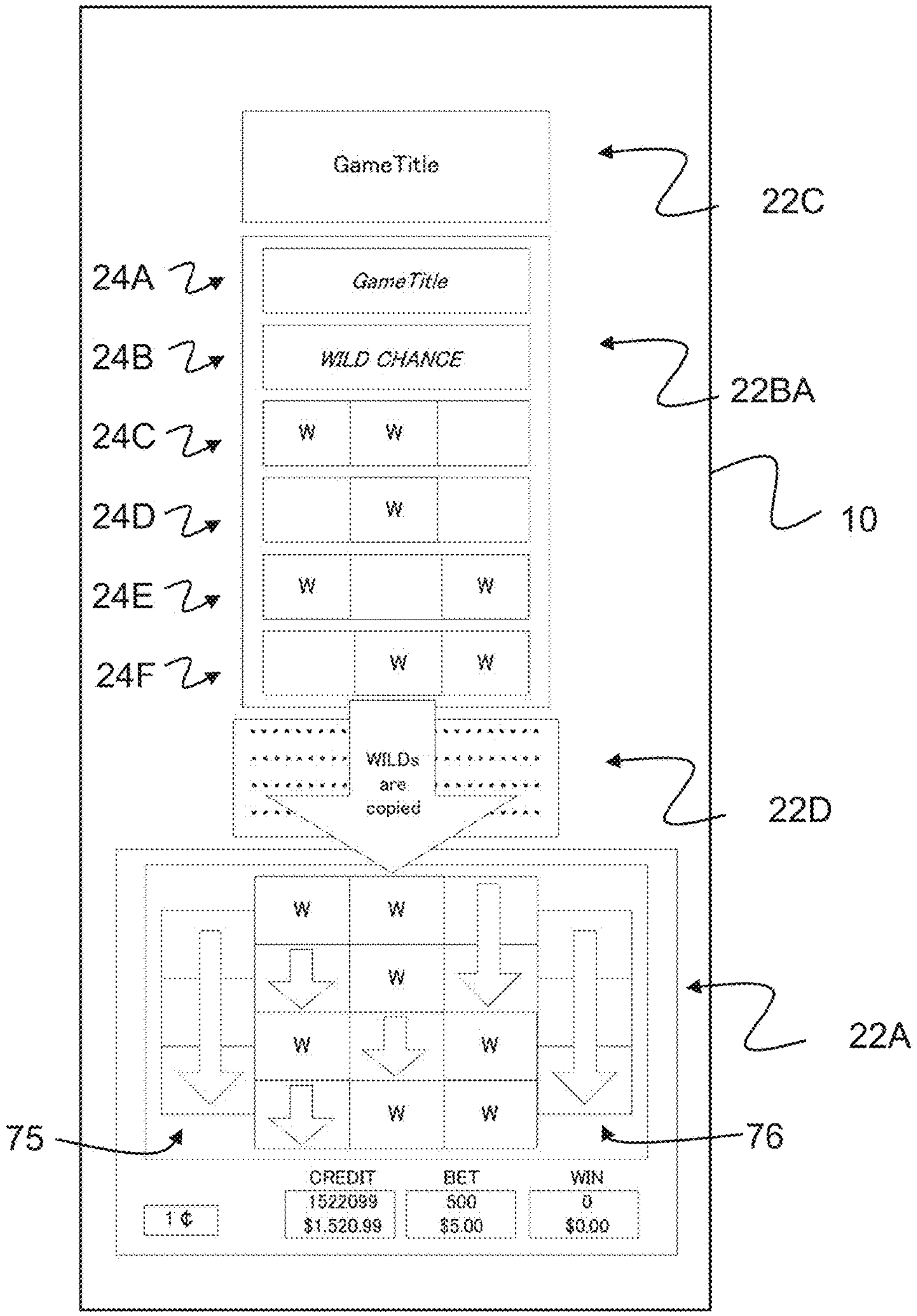

After the bonus pattern has been established, the bonus pattern is copied into the first grid 60A, as shown in FIG. 8G. In one embodiment, the bonus pattern may be copied to the first grid 60A while the reels 71-75 are still spinning. As shown in FIG. 8G, after the bonus pattern has been copied to the first grid 60A, reels 71-75 are still spinning. Further, reels 71-75 are still spinning and visible in the cells associated with a null symbol in the bonus pattern of symbols. Alternatively, the bonus patterns of symbols may be copied into the first grid 60A before the reels 71-75 start spinning or after the reels 71-75 have stopped spinning.

Figure 8H:
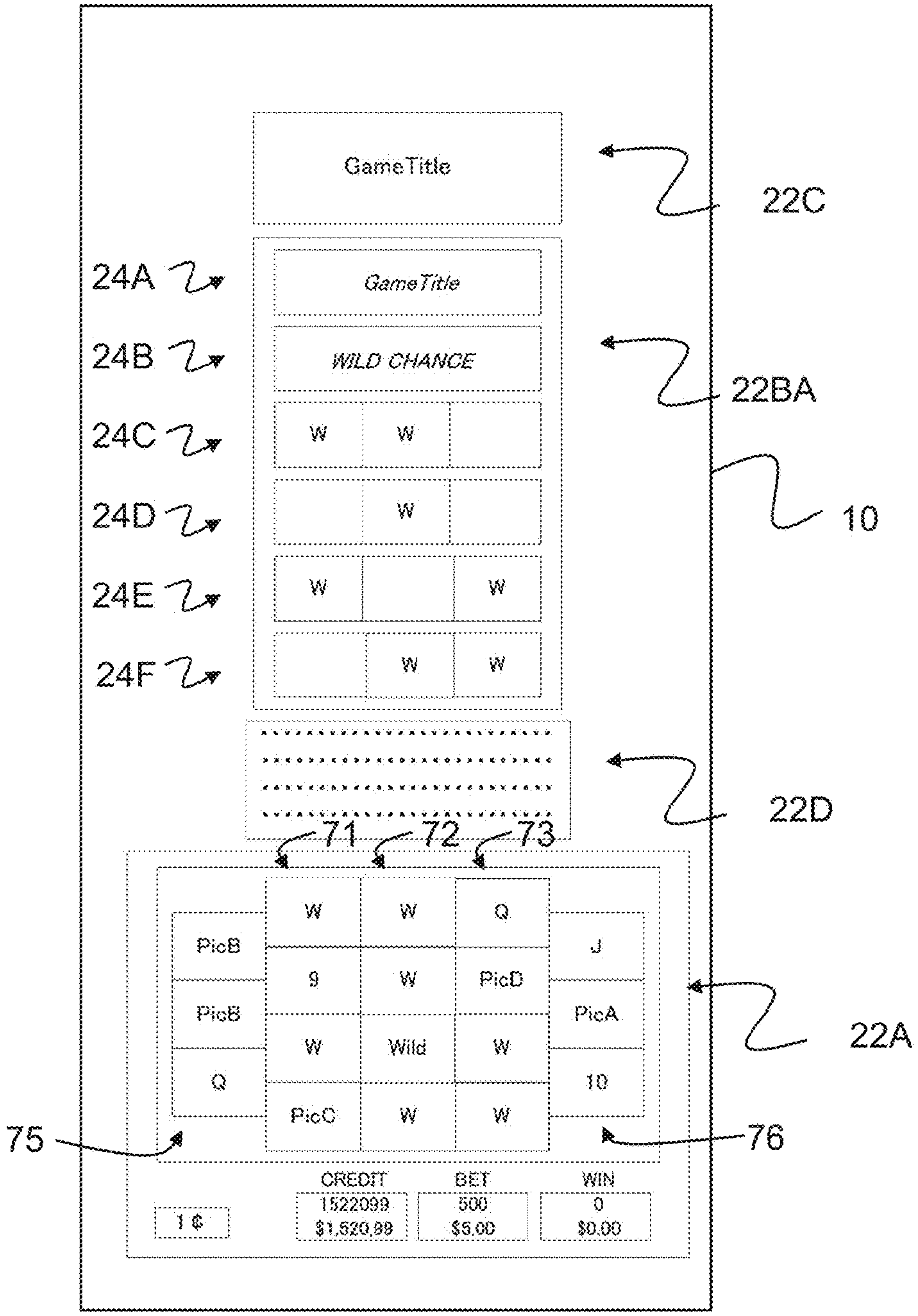

In the illustrated embodiment, after the bonus pattern is copied, the reels 71-75 are stopped and an outcome of the game is established as shown in FIG. 8H. The outcome of the game includes the bonus pattern of symbols and any remaining symbols from the first set of symbols. The outcome of the game is evaluated (against the pay table) and any winning combination results in an award (of credits) to the player.

Figure 8I:
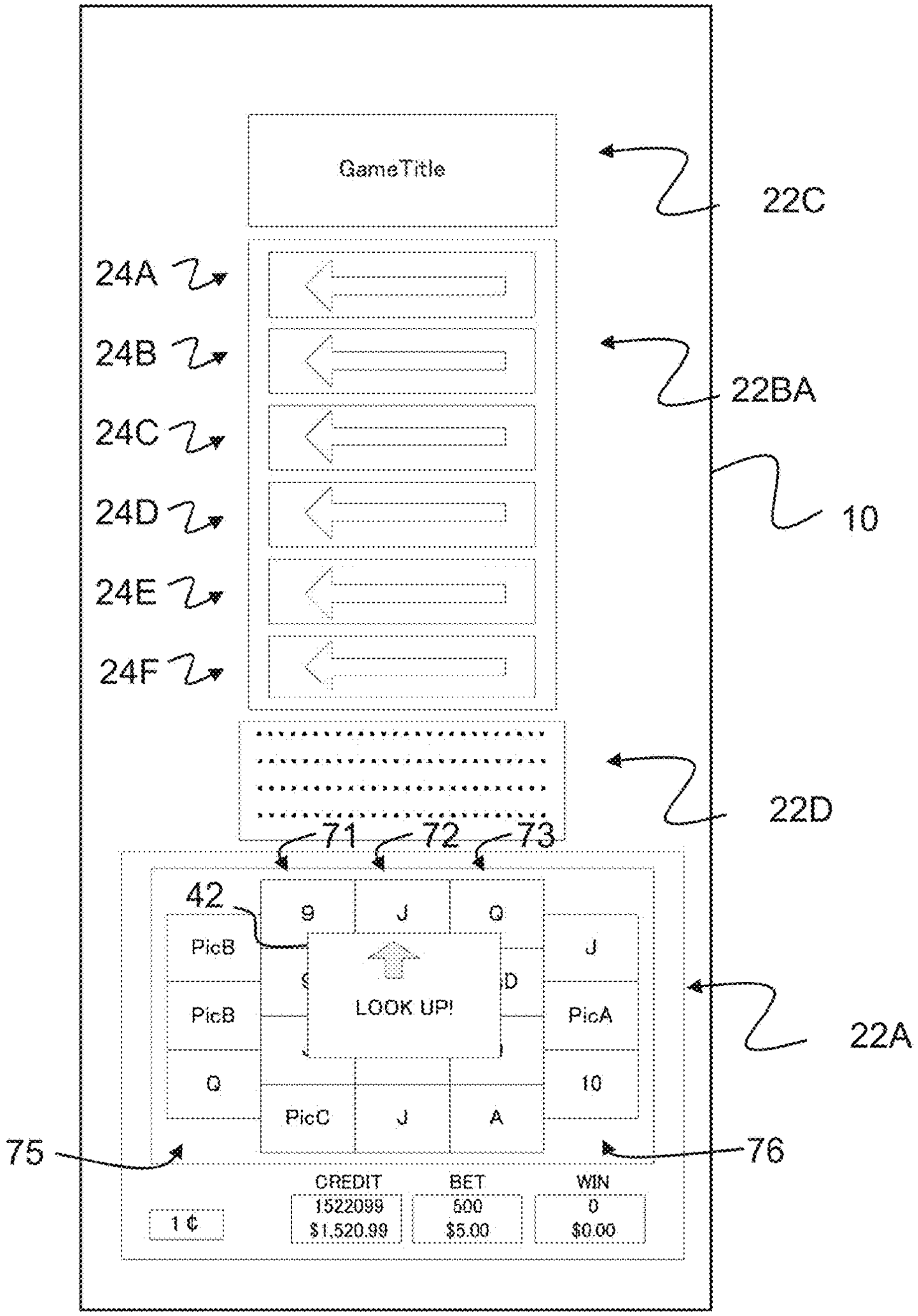
Figure 8J:
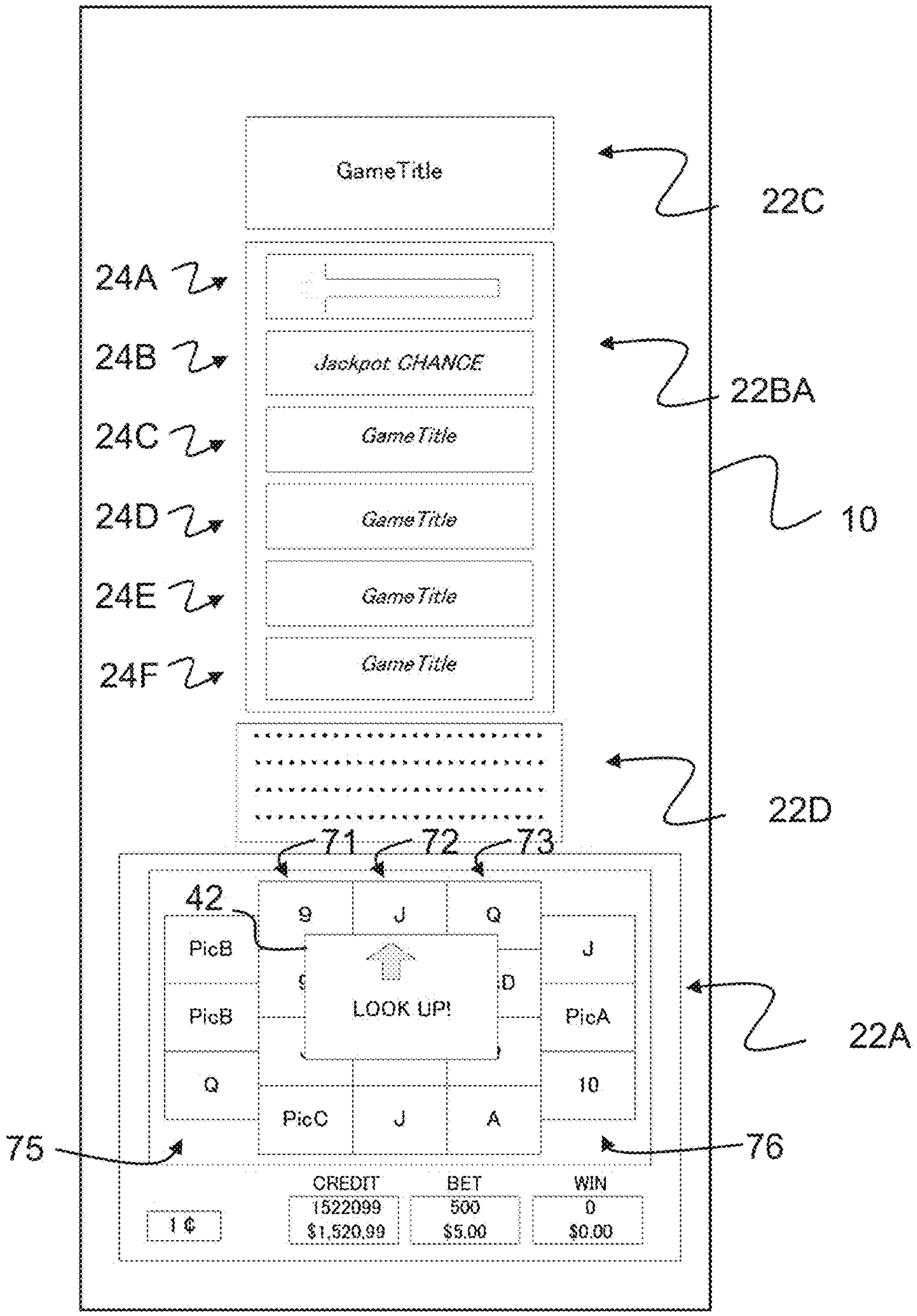
Figure 8K:
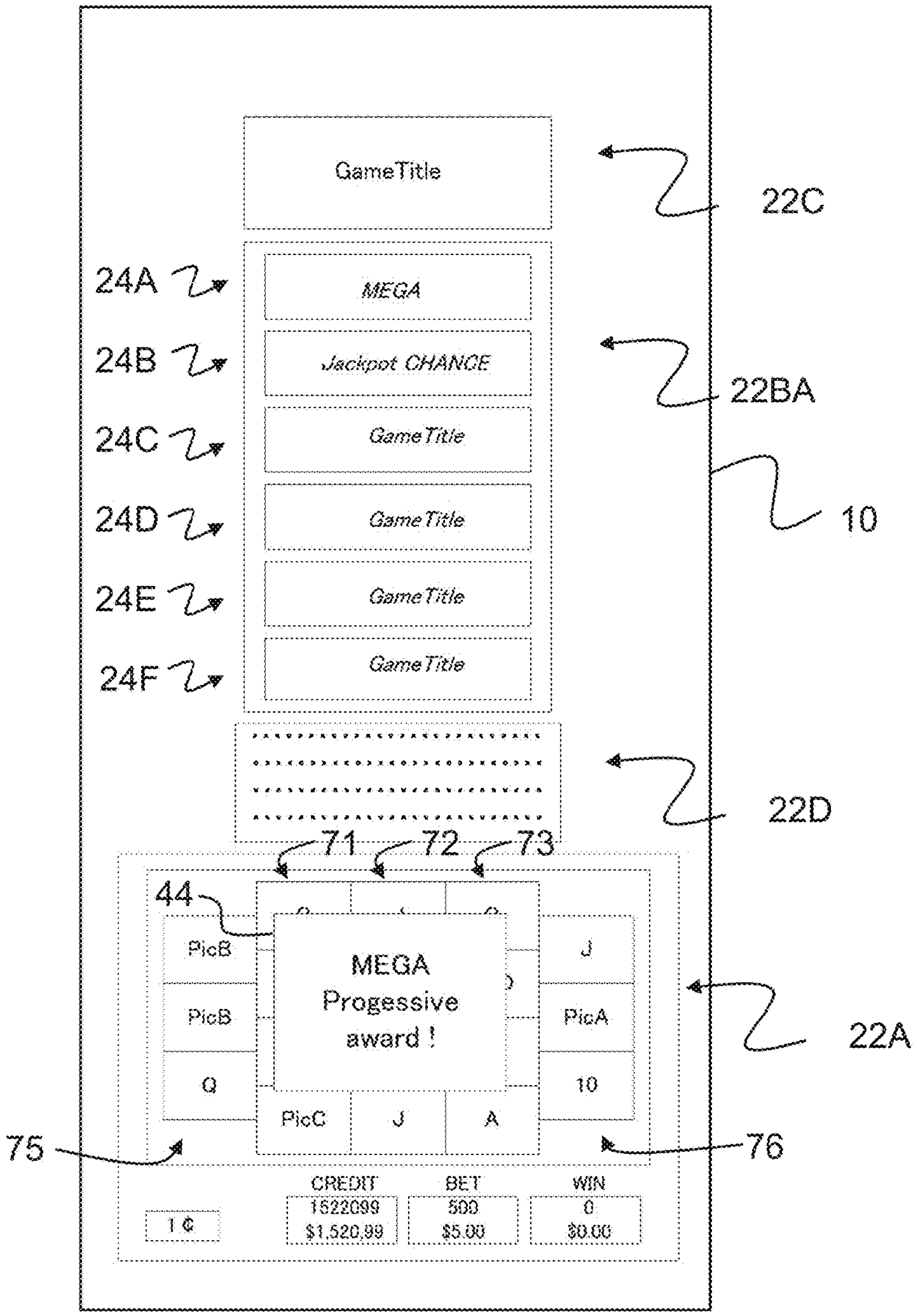

With specific reference to FIGS. 8I-8K, if the player has been awarded an opportunity to win a progressive award, then a progressive graphic 42 is displayed in the foreground. In the illustrated embodiment, the progressive graphic 42 is displayed after the initial result is shown in the first grid 60A. As shown in FIG. 8I, the first through sixth reel units 24A-24F are activated to spin the respective reels. As shown in FIG. 8J, the second reel unit 24B is stopped to provide an indication to the player ("Jackpot CHANCE") that the player has an opportunity to win a jackpot or progressive award. The third through sixth reel units 24C-24F may also be stopped to display the Game Title.

As shown in FIG. 8K, the second reel unit 24B is stopped to indicate to the player if a jackpot has been won. Then the first reel unit 24A is stopped to indicate to the player which one of the jackpots the player has won, e.g., 200 Credits, 500 Credits, Mini Jackpot, Mega Jackpot, or Maxi Jackpot.

As shown in FIG. 7, the first set of symbols form an initial outcome. In the illustrated embodiment, the game is a video slot game and the columns of the first grid 60A represent reels in the video slot game. The video slot game presents an animation that simulates rotation of the reel strips 71-75 in the respective column. In the illustrated embodiment, the initial outcome is displayed before the bonus pattern of symbols is copied into the first grid 60A.

Figure 9:
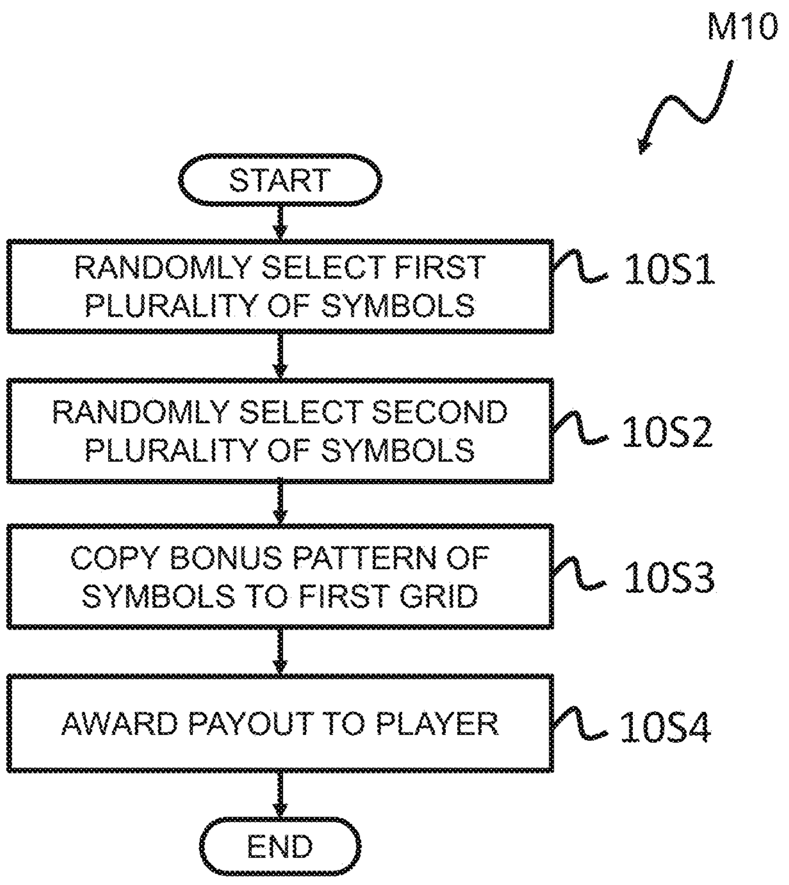
FIG. 9 is a flow chart describing the operation of the gaming machine in FIG. 1, according to one embodiment of the present invention.
Figure 10A:
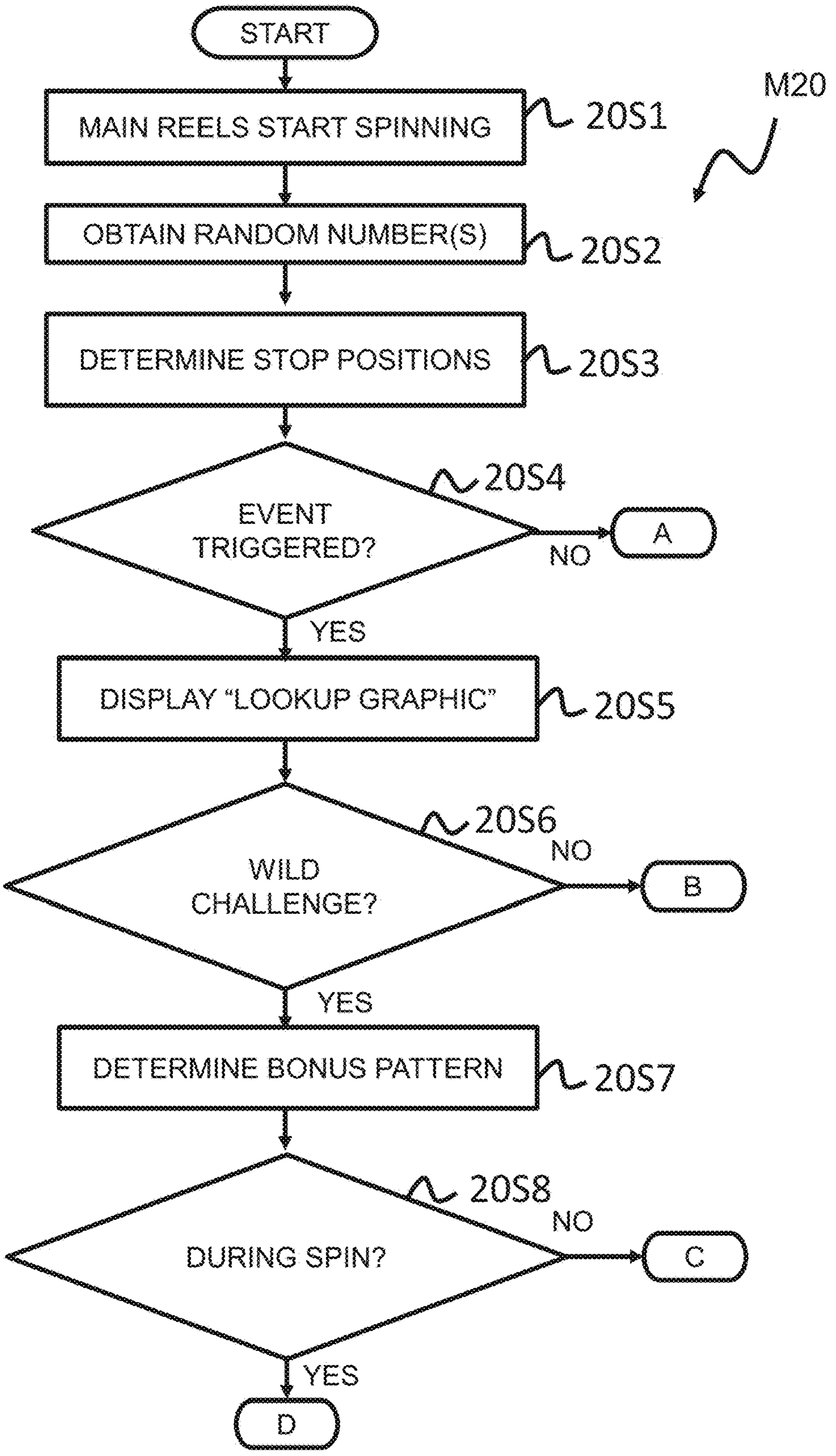
FIGS. 10A-10E are portions of a flow chart describing the operation of the gaming machine in FIG. 1, according to one embodiment of the present invention.
Figure 10B:
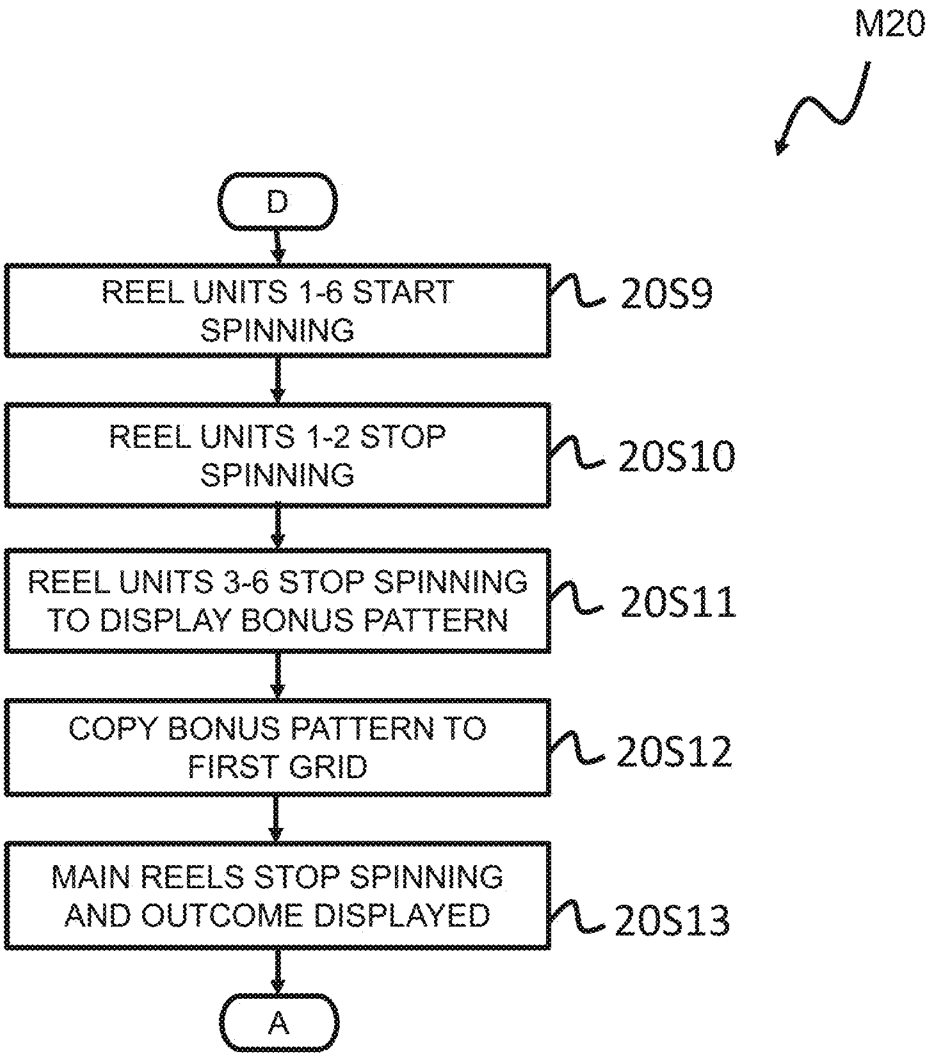
Figure 10C:
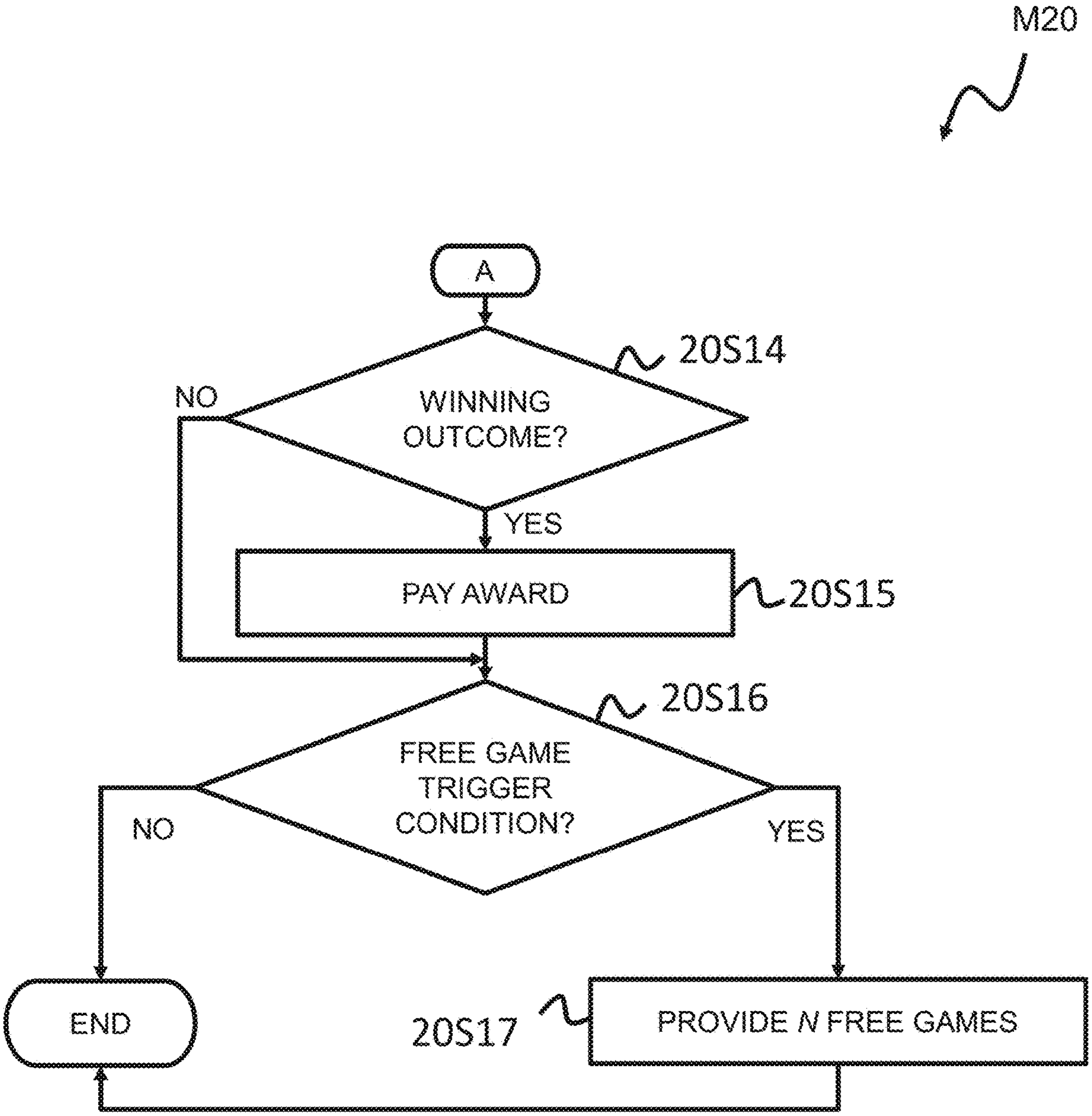
Figure 10D:
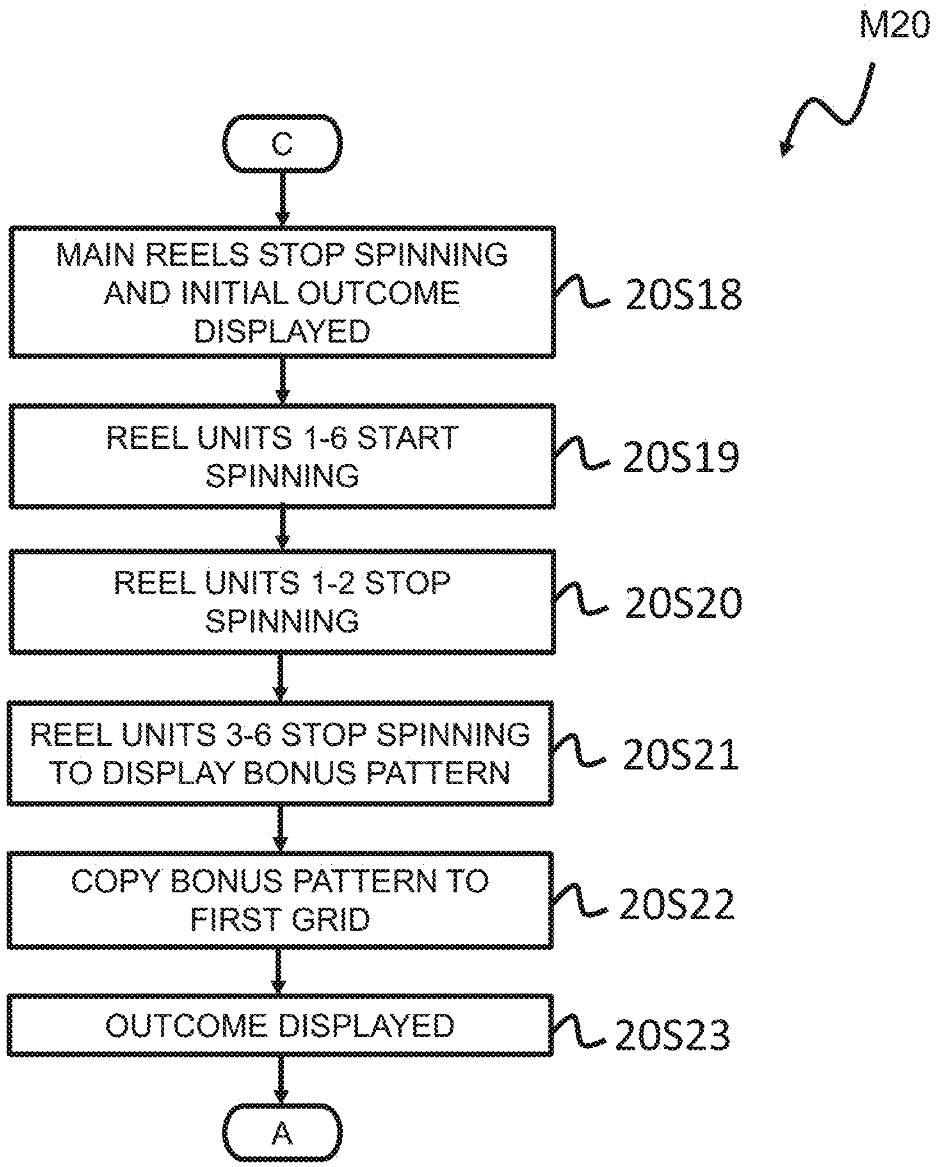
Figure 10E:
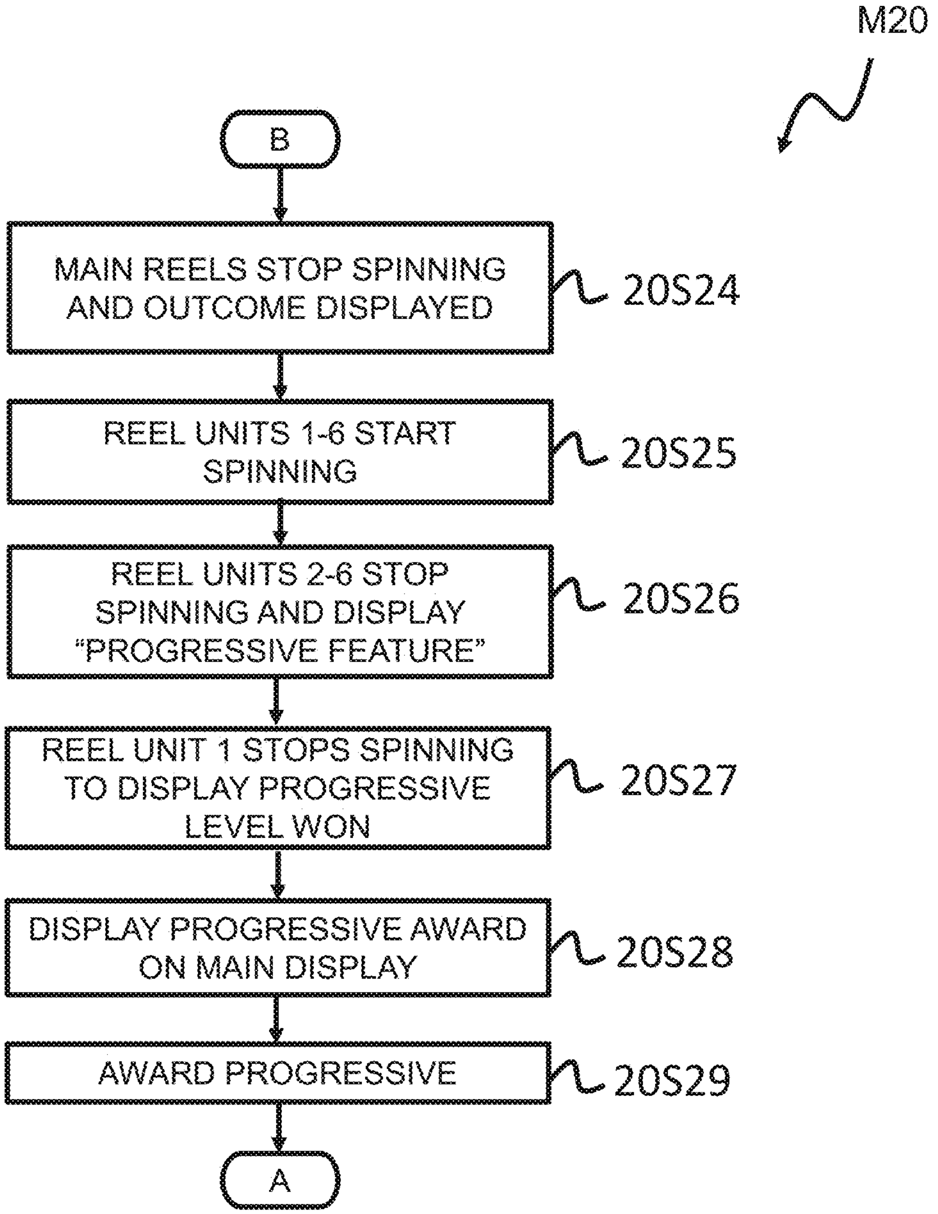

With reference to FIG. 9, in another aspect of the present invention, a control method M10 for a gaming machine 10 to provide a game to a player is provided. The gaming machine 10 includes a control unit 50, an operation unit 36, and a display unit 22. The operation unit 36 is operably connected to the control unit and configured to receive operation from the player. The display unit 22 is operably coupled to the control unit and configured to display a first symbol display area 22A and a second symbol display area 22B. The first display area 22A includes a first plurality of cells 64A arranged in a first grid 60A. The second display area 22B includes a second plurality of cells 64B arranged in a second grid 60B. The first grid 60A has a plurality of rows and a plurality of columns. The second symbol display area 22B includes a second plurality of cells 64B arranged in a second grid 60B. The second grid has a plurality of rows and a plurality of columns. Each cell 64B of the second plurality of cells is associated with one of the cells 64A of the first plurality of cells. The control unit 50 is operably coupled to the operation unit 36 and the display unit 22 and is configured to initiate a game in response to player operation. The control method M10, in response to initiation of the game performs a plurality of steps. In a first step 10S1, a first plurality of symbols associated with the first symbol display area 22A is randomly selected. Each symbol in the first set of symbols is associated with one of the plurality of cells 64A in the first grid 60A. The symbols in the first plurality of symbols are selected from a first set of symbols and form an initial outcome.

In a second step 10S2, a second plurality of symbols associated with the second symbol display area 22B is randomly selected. Each symbol in the second set of symbols is associated with one of the plurality of cells 64B in the second grid 60B. The symbols in the second plurality of symbols are selected from a second set of symbols. The second set of symbols includes a null symbol and at least one non-null symbol. The second plurality of symbols form a bonus pattern of symbols.

In a third step 10S3, the bonus pattern of symbols are copied from the second grid 60B to the first grid 60A. The bonus pattern of symbols and any remaining symbols from the first plurality of symbols in the first grid 60A form a second outcome.

In a third step 10S4, a payout is awarded to the player as a function of the second outcome. The award may be established as a function of the second outcome, a wager, a number of selected or played pay lines and a predetermined pay table.

With reference to 10A-10E, an exemplary flow diagram of a method M20 for operating the gaming machine 10 is shown, according to another embodiment of the present invention.

In the illustrated embodiment, a game is initiated. In a first step 20S1, the main reels 71-75 are spun. In a second step 20S2, a random number associated with each reel is randomly determined. In a third step 20S3, the stop position for each reel as a function of the associated random number is determined.

In a fourth step 20S4, a determination is made if a trigger condition has occurred. If the trigger condition has occurred, then the method proceeds to a fifth step 20S5. Otherwise, the control method proceeds to a fourteenth step 20S14 (see below).

In one embodiment, the trigger condition is a mystery trigger determined by a random number from the RNG. The mystery trigger is independent of the first set of symbols or initial outcome. In another embodiment, the trigger condition is a function of the initial outcome. For example, the trigger condition may be the appearance of one or more designated symbols in the outcome. In still another embodiment, the trigger condition may be an external event. For example, the trigger condition may be triggered by the player ranking or tracking system 57 or by a casino management system. In a further embodiment, the trigger may be based on the play history of the player, e.g., the play history during the current session.

In the fifth step 20S5, a graphic 40 is displayed to indicate that the feature has been initiated. In the illustrated embodiment, the graphic 40 instructs the player to "Look UP", i.e., to the second display area 22B. In the embodiment of method M20, during the feature the player may have an opportunity for the bonus pattern to be used and/or to win a progressive jackpot award.

In a sixth step 20S6, a second trigger condition may be used to determine if the Wild Challenge feature is to be awarded. The second trigger condition may be similar to the trigger condition discussed above, or based on a different set of criteria. If the Wild Challenge feature is awarded, then the method M20 proceeds to a seventh step 20S7. Otherwise, the method M20 proceeds to a twenty-fourth step 20S24 (see below).

In the seventh step 20S7, the bonus pattern is determined. In an eighth step 20S8, the method 20 determines if the bonus pattern of symbols is to be copied to the first grid 60B during the spinning of the main reels 71-75 or after the main reels 71-75 have stopped spinning.

In one aspect of the present invention, whether or not to copy the bonus pattern while the main reels are spinning may be based on the difference between the payout with the bonus pattern and the payout without the bonus pattern, i.e., based on the initial outcome.

For instance, if the difference in the payouts is above a predetermined threshold, for example, 30× or 40×, then the bonus pattern may be copied to the first grid 60A while the main reels are spinning to increase player anticipation. Alternatively, if the difference in the payouts is above a predetermined threshold, then there may be an increased probability, e.g., 80% versus 20% that the bonus pattern is copied to the first grid 60A.

If in the eighth step 20S8, the method M20 determines that the bonus pattern is to be copied to the first grid 60A while the main reels 71-75 are still spinning, then the method M20 proceeds to a ninth step 20S9. Otherwise, the method M20 proceeds to an eighteenth step 20S18.

In the ninth step 20S9, the reel units 24 start spinning. In a tenth step 20S10, the first and second reel units 24A, 24B are stopped to display the Game Title and the Wild Chance graphic (see above). In an eleventh step 20S11, the third through sixth reel units 24C, 24D, 24E, 24F are stopped to reveal the bonus pattern (see above). In a twelfth step 20S12, the bonus pattern of symbols is copied from the second grid 60B to the first grid 60A. In a thirteenth step 20S13, the main reels 71-75 are stopped. Then, control proceeds to a fourteenth step 20S14.

The bonus pattern of symbols (as copied into the first grid 60A) and any remaining, i.e., visible, symbols, from the first plurality of symbols in the first grid 60A form the outcome of the game. In the fourteenth step 20S14, the outcome is compared with a predetermined pay table and (played) pay lines. If the outcome forms a winning outcome or combination, then in a fifteenth step 20S15, an award is paid to the player. Otherwise, the method proceeds to a sixteenth step 20S16.

In the illustrated embodiment, the game may also include a free spin feature. So, in the sixteenth step 20S16, if a free spin trigger condition has occurred, then a number of free spins are provided in a seventeenth step 20S17.

If in the eighth step 20S8, the method M20 determines that the bonus pattern is to be copied to the first grid 60A after the main reels stop spinning, then the method M20 proceeds to an eighteenth step 20S18.

In the eighteenth step 20S18, the main reels 71-75 are stopped spinning and an initial outcome is displayed. The initial outcome includes the first plurality of symbols displayed in the respective cell 64A of the first grid 60A.

In a nineteenth step 20S19, the reel units 24 start spinning. In a twentieth step 20S20, the first and second reel units 24A, 24B are stopped to display the Game Title and the Wild Chance graphic (see above), respectively. In a twenty-first step 20S21, the third through sixth reel units 24C, 24D, 24E, 24F are stopped to reveal the bonus pattern (see above). In a twenty-second step 20S22, the bonus pattern of symbols is copied from the second grid 60B to the first grid 60A. The bonus pattern of symbols (as copied into the first grid 60A) and any remaining, i.e., visible, symbols, from the first plurality of symbols in the first grid 60A form the outcome of the game. In a twenty-third step 20S23, the outcome of the game is displayed in the first grid 60A.

The method M20 then proceeds to the fourteenth step 20S14.

If in the sixth step 20S6, the method determined that the Wild Challenge had not been triggered, then the player is awarded an opportunity to win a progressive or jackpot award. In a twenty-fourth step 20S24, the main reels 71-75 stop spinning and the initial outcome is displayed. A payout may be awarded to the player based on the initial outcome if a winning condition has occurred.

In a twenty-fifth step 20S25, the reel units 24 start spinning. In a twenty-sixth step 20S26, the second through sixth reel units 24B, 24C, 24D, 25E, 25F stop spinning to display an indication to the player that a progressive chance or jackpot has been awarded. In a twenty-sixth step 20S26, the first reel unit 24A is stopped to indicate the progressive award or jackpot awarded to the player. In a twenty-sixth step 20S26, the progressive or jackpot award is awarded to the player. The method M20 then proceeds to the fourteenth step 20S14.

Figure 11:
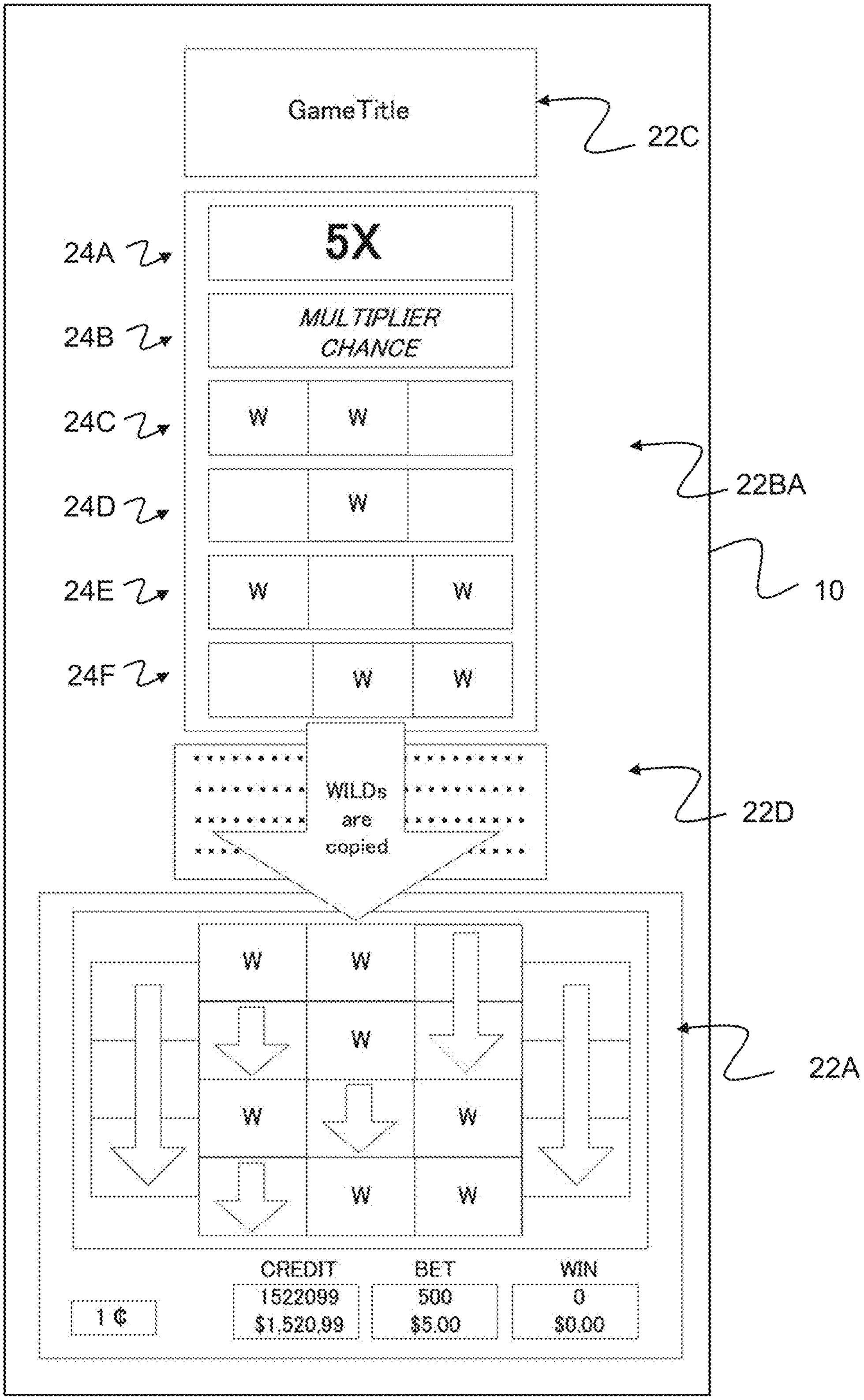
FIG. 11 is a diagrammatic illustration of the display area of the gaming machine in FIG. 1, according to another embodiment of the present invention.
Figure 12:
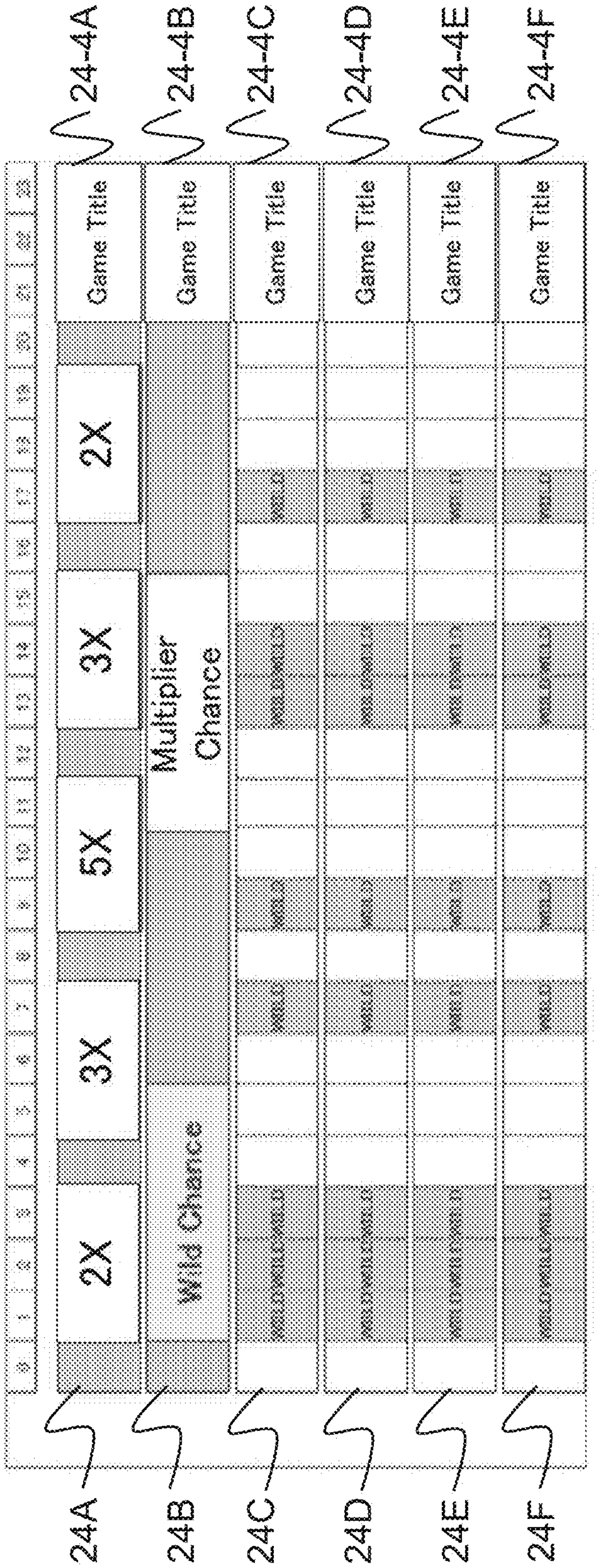
FIG. 12 is a diagram illustrating types of symbols displayed in another one of the symbol display regions, according to an embodiment of the present invention.
Figure 13A:
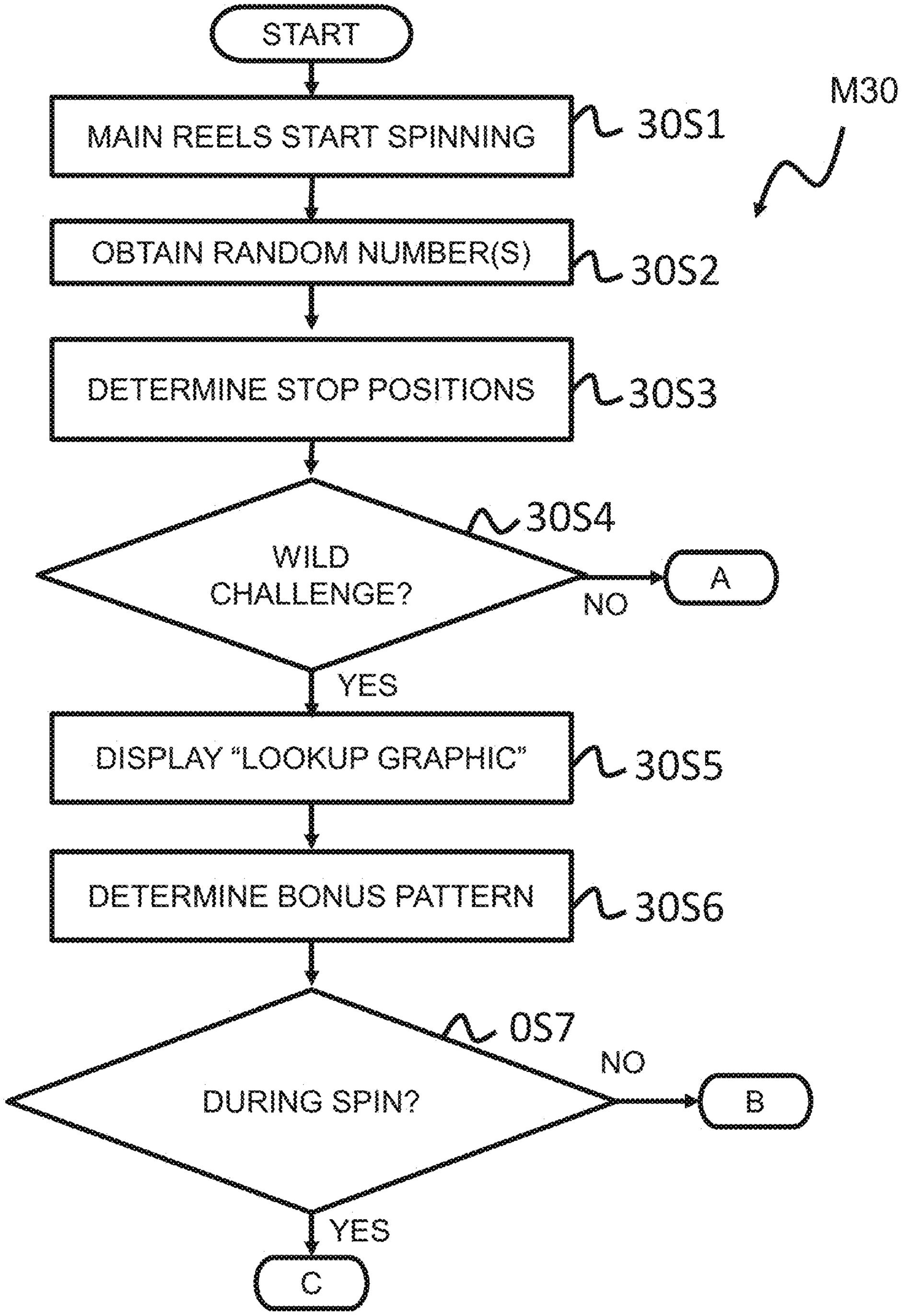
FIG. 13A-13E are portions of a flow chart describing the operation of the gaming machine in FIG. 1, according to one embodiment of the present invention.
Figure 13B:
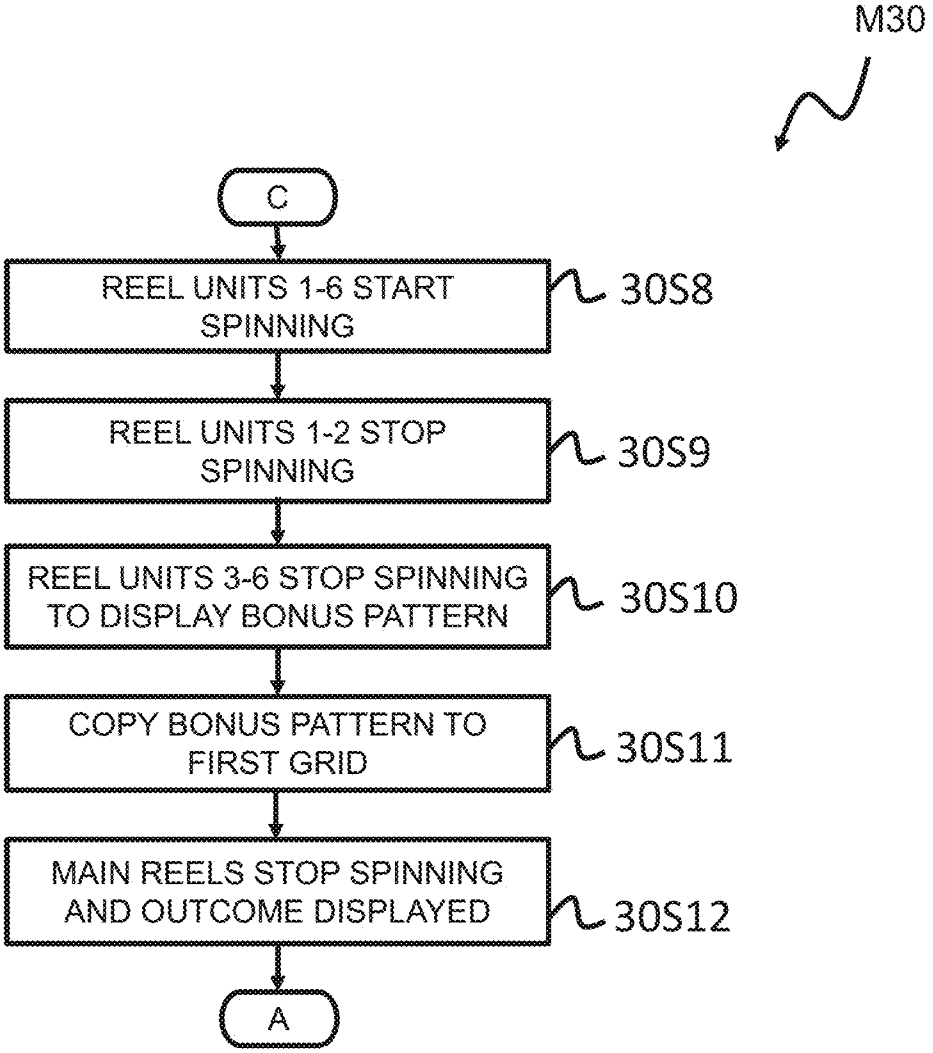
Figure 13C:
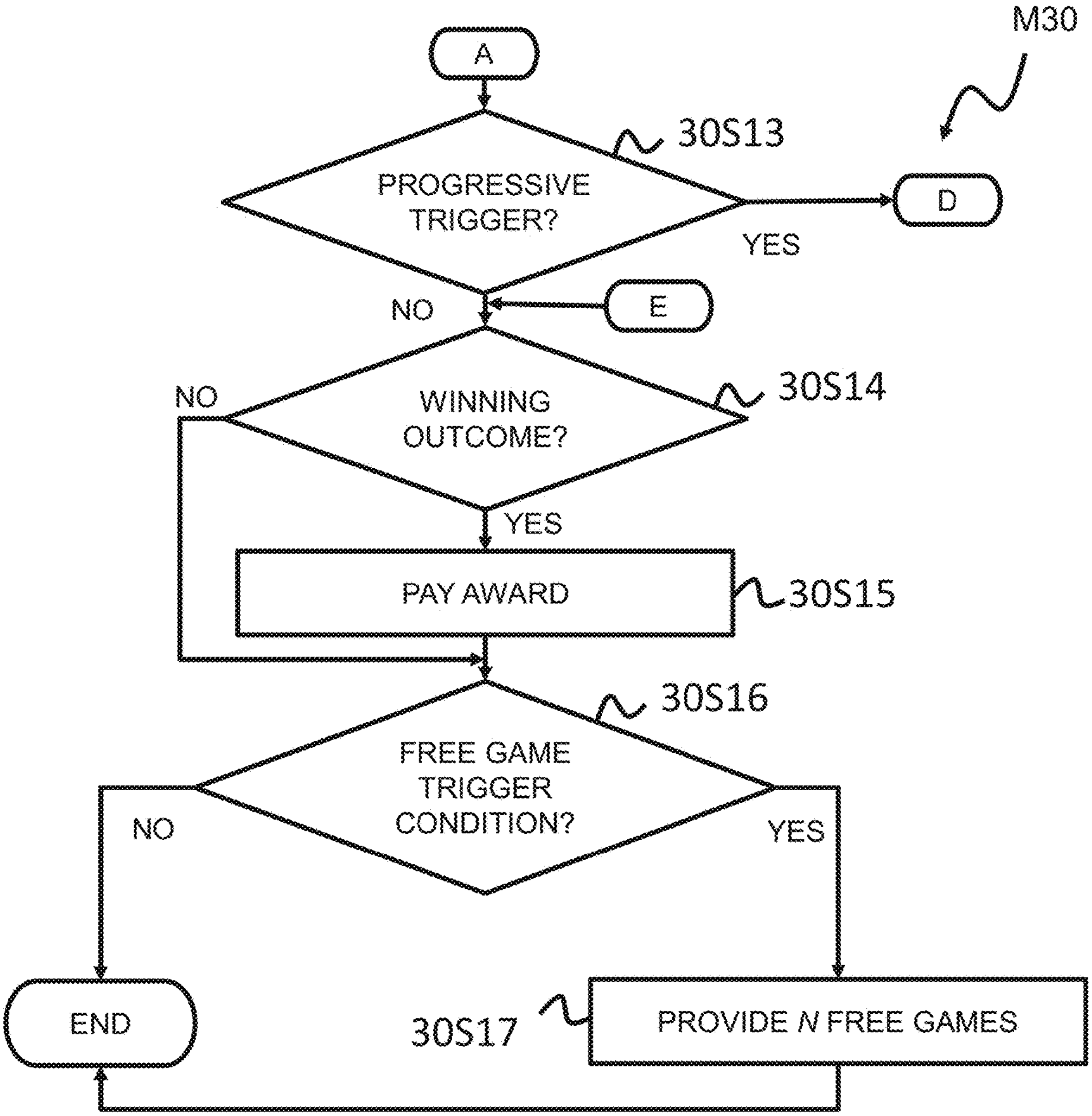
Figure 13D:
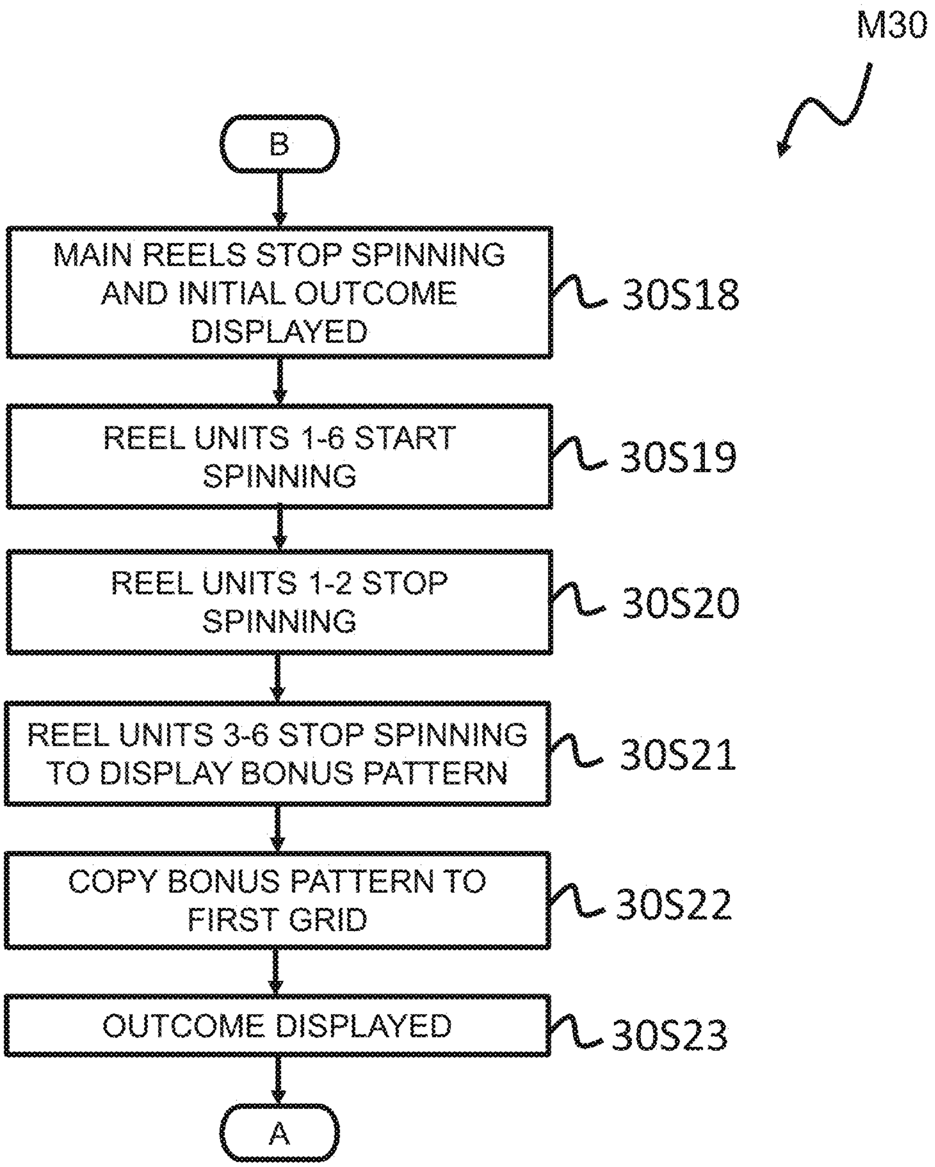
Figure 13E:
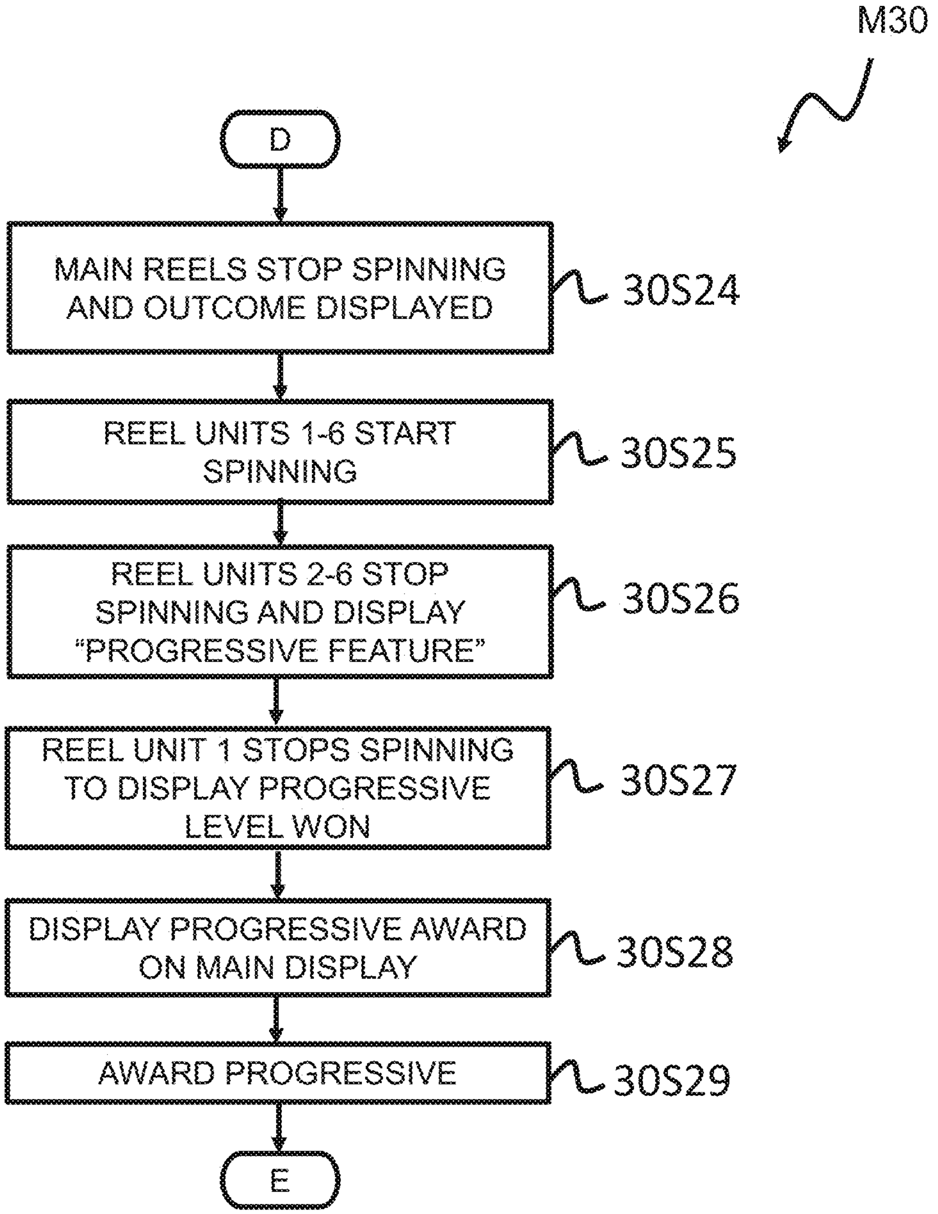

With reference to FIGS. 11 and 12, in an alternative embodiment the second display area 22B may be used to provide a multiplier opportunity (instead of the opportunity for a progressive jackpot discussed above). As shown, the first reel strip 24-4A includes a plurality of multiplier values, e.g., 2×, 3×, and 5×. In this embodiment, the multiplier opportunity may be provided if the bonus chance is provided or randomly provided (independently).

If the multiplier opportunity is provided, the second reel unit 24B is controlled to indicate "Multiple Chance" to the player (see FIG. 12). Then, the first reel unit 24A is controlled to indicate the selected multiplier value to the player.

The multiplier opportunity may be provided during the main game (with or without the Wild Chance opportunity), during the bonus game and/or during the feature.

In the embodiment shown in FIGS. 10A-10E, if the event trigger condition is triggered in the fourth step 20S4, then the player is provided either the WILD CHALLENGE opportunity or an opportunity to win a progressive jackpot. In other words, if the trigger condition is satisfied in the fourth step 20S4, the player is awarded either the WILD CHALLENGE opportunity or an opportunity to win a progressive jackpot. Thus, in a single game, the player cannot be provided with both the WILD CHALLENGE opportunity and an opportunity to win a progressive jackpot.

In an alternative embodiment shown in FIGS. 13A-13E, the WILD CHALLENGE opportunity and the opportunity to win a progressive jackpot are independently determined in a single game. Thus, the player has the opportunity to gain both the WILD CHALLENGE opportunity and an opportunity to win a progressive jackpot. With reference to 13A-13E, an exemplary flow diagram of a method M30 for operating the gaming machine 10 is shown, according to another embodiment of the present invention.

In the illustrated embodiment, a game is initiated. In a first step 30S1, the main reels 71-73, 75, 76 are spun. In a second step 30S2, a random number associated with each reel is randomly determined. In a third step 30S3, the stop position for each reel as a function of the associated random number is determined.

In a fourth step 20S4, a determination is made if a Wild Challenge trigger condition has occurred. If the Wild Challenge trigger condition has occurred, then the method proceeds to a fifth step 20S5. Otherwise, the control method proceeds to a fifteenth step 20S15 (see below).

In one embodiment, the trigger condition is a mystery trigger determined by a random number from the RNG. The mystery trigger is independent of the first set of symbols or initial outcome. In another embodiment, the trigger condition is a function of the initial outcome. For example, the trigger condition may be the appearance of one or more designated symbols in the outcome. In still another embodiment, the trigger condition may be an external event. For example, the trigger condition may be triggered by the player ranking or tracking system 57 or by a casino management system. In a further embodiment, the trigger may be based on the play history of the player, e.g., the play history during the current session.

In the fifth step 30S5, a graphic 40 is displayed to indicate that the feature has been initiated. In the illustrated embodiment, the graphic 40 instructs the player to "Look Up", i.e., to the second display area 22B.

In the sixth step 30S6, the bonus pattern is determined (see above). In a seventh step 30S7, the method M30 determines if the bonus pattern of symbols is to be copied to the first grid 60A during the spinning of the main reels 71-75, or after the main reels 71-75 have stopped spinning.

In one aspect of the present invention, whether or not to copy the bonus pattern while the main reels are spinning may be based on the difference between the payout with the bonus pattern and the payout without the bonus pattern, i.e., based on the initial outcome.

For instance, if the difference in the payouts is above a predetermined threshold, for example, 30× or 40×, then the bonus pattern may be copied to the first grid 60A while the main reels are spinning to increase player anticipation. Alternatively, if the difference in the payouts is above a predetermined threshold, then there may be an increased probability, e.g., 80% versus 20%, that the bonus pattern is copied to the first grid 60A.

If in the seventh step 30S7, the method M30 determines that the bonus pattern is to be copied to the first grid 60A while the main reels 71-75 are still spinning, then the method M30 proceeds to an eighth step 30S8. Otherwise, the method M30 proceeds to an eighteenth step 30S18.

In the eighth step 30S8, the reel units 24 start spinning. In a ninth step 30S9, the first and second reel units 24A, 24B are stopped to display the Game Title and the Wild Chance graphic (see above). In a tenth step 30S10, the third through sixth reel units 24C, 24D, 24E, 24F are stopped to reveal the bonus pattern (see above). In an eleventh step 30S11, the bonus pattern of symbols is copied from the second grid 60B to the first grid 60A. In a twelfth step 30S12, the main reels 71-75 are stopped. Then, control proceeds to a thirteenth step 30S13.

In the thirteenth step 30S13, the method M30 determines if a progressive jackpot or progressive opportunity has been triggered. If so, then the method M30 proceeds to a twenty-fourth step 30S24. Otherwise, the method M30 proceeds to a fourteenth step 30S14.

The bonus pattern of symbols (as copied into the first grid 60A) and any remaining, i.e., visible, symbols, from the first plurality of symbols in the first grid 60A form the outcome of the game. In the fourteenth step 30S14, the outcome is compared with a predetermined pay table and (played) pay lines. If the outcome forms a winning outcome or combination, then in a fifteenth step 30S15, an award is paid to the player. Otherwise, the method proceeds to a sixteenth step 30S16.

In the illustrated embodiment, the game may also include a free spin feature. So, in the sixteenth step 30S16, if a free spin trigger condition has occurred, then a number of free spins are provided in a seventeenth step 30S17.

If in the seventh step 30S7, the method M30 determines that the bonus pattern is to be copied to the first grid 60A after the main reels stop spinning, then the method M30 proceeds to an eighteenth step 30S18.

In the eighteenth step 30S18, the main reels 71-75 are stopped spinning and an initial outcome is displayed. The initial outcome includes the first plurality of symbols displayed in the respective cell 64A of the first grid 60A.

In a nineteenth step 30S19, the reel units 24 start spinning. In a twentieth step 20S20, the first and second reel units 24A, 24B are stopped to display the Game Title and the Wild Chance graphic (see above), respectively. In a twenty-first step 30S21, the third through sixth reel units 24C, 24D, 24E, 24F are stopped to reveal the bonus pattern (see above). In a twenty-second step 30S22, the bonus pattern of symbols is copied from the second grid 60B to the first grid 60A. The bonus pattern of symbols (as copied into the first grid 60A) and any remaining, i.e., visible, symbols, from the first plurality of symbols in the first grid 60A form the outcome of the game. In a twenty-third step 30S23, the outcome of the game is displayed in the first grid 60A.

The method M20 then proceeds to the thirteenth step 30S13.

If in the seventh step 30S7, the method M30 determined that the progressive opportunity or progressive trigger had been triggered, then the player is awarded an opportunity to win a progressive or jackpot award. In a twenty-fourth step 30S24, the main reels 71-75 stop spinning and the initial outcome is displayed. A payout may be awarded to the player based on the initial outcome if a winning condition has occurred.

In a twenty-fifth step 30S25, the reel units 24 start spinning. In a twenty-sixth step 30S26, the second through sixth reel units 24B, 24C, 24D, 25E, 25F stop spinning to display an indication to the player that a progressive chance or jackpot has been awarded. In a twenty-sixth step 30S26, the first reel unit 24A is stopped to indicate the progressive award or jackpot awarded to the player. In a twenty-sixth step 30S26, the progressive or jackpot award is awarded to the player. The method M30 then proceeds to the thirteenth step 30S13.

Next, a description of a program of the gaming machine 10 for operating one or a plurality of computers as the control unit 50 is provided. The gaming machine 10 stores the program in the memory, and can execute the program. The gaming machine 10 can access the program stored in the memory and can operate as the gaming machine 10 of the present embodiment by the program.

Further, the program according to the embodiment, may be provided through a network or stored in a recording medium. Recording media such as a floppy (registered trademark) disk, CD-ROM, DVD, or ROM and the like, or semiconductor memory and the like are exemplified as a recording medium. In this case, a program stored in the memory uses a reading device inside the gaming machine 10 such as a floppy (registered trademark) disk drive device, CD-ROM drive device, and DVD drive device and the like.

The embodiments of the present invention are described above, but the present invention is not limited to such embodiments, a variety of variations are possible.

In such an embodiment, a gaming machine providing a game in the form of a slot machine is described, but this is not limited thereto, and a game in the state of poker, a video card game called black jack, bingo, keno, a wheel game and the like may be provided. Further, it is possible to apply the present invention to a pachinko machine or a pachinko slot machine.

Referring to FIG. 1, in one embodiment, the operation unit 36 includes a plurality of user input devices that may include an acceptor device which accepts media associated with a monetary value to establish a credit balance, a validator configured to identify the physical media, a cash-out button actuatable to cause an initiation of a payout associated with the credit balance. The acceptor device may include a touchscreen display associated with the display unit 22 and/or the player tracking/ranking unit 57, the bill/ticket identification unit 32, the operation unit 36, the player tracking/ranking unit 57, a coin slot, a ticket in ticket out (TITO) system, a bill acceptor, and/or any suitable device that enables the gaming machine 10 to receive media associated with a monetary value and establish a credit balance for use in playing the gaming machine. In one embodiment, the acceptor device may be configured to receive physical media such as, for example, a coin, a medal, a ticket, a card, a bill, currency, and/or any suitable physical media that enables the gaming machine 10 to function as described herein. The acceptor device may also be configured to accept virtual media such as, for example, a player tracking account, a virtual credit balance, reward points, gaming credits, bonus points, and/or any suitable virtual media that enables the gaming machine 10 to function as described herein. For example, in one embodiment, the coin slot may include an opening that is configured to receive coins and/or tokens deposited by the player into the gaming machine 10. The control unit 50 converts a value of the coins and/or tokens to a corresponding amount of gaming credits that are used by the player to wager on games played on the gaming machine 10. The bill acceptor may include an input and output device that is configured to accept a bill, a ticket, and/or a cash card into the bill acceptor to enable an amount of gaming credits associated with a monetary value of the bills, ticket, and/or cash card to be credited to the gaming machine 10. In one embodiment, the bill acceptor also includes a printer (not shown) that is configured to dispense a printed voucher ticket that includes information indicative of an amount of credits and/or money paid out to the player by the gaming machine 10 during a gaming session. The voucher ticket may be used at other gaming devices, or redeemed for cash, and/or other items as part of a casino cashless system.

In the embodiment, determining the stop position of each reel is described as consecutively acquiring a random number that is used respectively, but the acquisition procedure of the random number is not limited to this. For example, when the game starts, the control unit 50 acquires these random numbers in a batch, and each random number may be stored in the storage area of the non-erasing memory 53 or the storage 54 when power failure occurs. In this type of situation, even when a power failure and the like occurs during a game, because the control unit 50 acquired the random number from the memory 53 or the storage 54 when the game started before the power failure occurred, when resuming the game after recovering from a power failure, the progress of the game can be reproduced. For example, when a game result obtaining a high payout is formed right before a power failure occurs, the player will be greatly dissatisfied if the progress of the game is not similar after recovering from a power failure. However, as mentioned above, when the game starts, all of the random numbers are acquired in a batch, and by saving these random numbers in the memory 53 or the storage 54, such great dissatisfaction can be avoided for the player because the progress of a game similar to before a power failure occurred can be reproduced after recovering from a power failure.

Further, in the embodiment, a bill or ticket is displayed as game value, and received by these bill/ticket identification devices, and a form where a ticket is output by a printer unit is described, but the present invention is not limited to this. The game value is a concept including tangible objects such as a coin, bill, coin, medal, ticket, and the like, or electronic data that has a value equivalent to these. For example, a coin is received by the coin accepter, and there may be a form where a coin is paid by a coin hopper. A player is identified and credit that is accumulated in an account on a server is used, there may be a form where credit is paid to an account, information of credit stored in a storage medium of a magnetic card, IC card and the like is read and used, and there may be a form where credit is paid by writing to the storage medium.

Further, in the embodiment, when showing a free game provided as a bonus game, a bonus game that uses a different virtual reel strip from a regular game may be provided. Further, there could be provided a feature game according to a value of the random number acquired during a regular game.

Further, set conditions providing a bonus or feature game are not limited to trigger determination or line determination, for example, there may be a configuration providing a bonus game when the bet number surpasses a predetermined value. There could be a configuration providing a bonus game according to a value of the random number acquired during a regular game.

Further, in the embodiment, a form providing a free game for a predetermined number of times as a bonus game is shown, and a bonus game that is not limited to a number of times may be provided. In this situation, there could be a configuration providing a bonus game until an end condition is satisfied, as an end condition is a combination of specified symbols, or a determining bonus game based on a random number.

Exemplary embodiments of a gaming device, a gaming system, and a method of providing an award to a player are described above in detail. The gaming device, system, and method are not limited to the specific embodiments described herein, but rather, components of the gaming device and/or system and/or steps of the method may be utilized independently and separately from other components and/or steps described herein. For example, the gaming device may also be used in combination with other gaming systems and methods, and is not limited to practice with only the gaming device as described herein. Rather, an exemplary embodiment can be implemented and utilized in connection with many other gaming system applications. For instance, the present invention is applicable to a gaming system which is a combination of a community gaming system and individual gaming devices. In such a case, the individual gaming device and the community gaming device provide the feature, the bonus game, and/or the progressive jackpot described herein.

A controller, computing device, or computer, such as described herein, includes at least one or more processors or processing units and a system memory. The controller typically also includes at least some form of computer-readable media. By way of example and not limitation, computer-readable media may include computer storage media and communication media. Computer storage media may include volatile and nonvolatile, removable and non-removable media implemented in any method or technology that enables storage of information, such as computer-readable instructions, data structures, program modules, or other data. Communication media typically embody computer-readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer-readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus, are not intended to limit in any way the definition and/or meaning of the term "processor."

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus, are not intended to limit in any way the definition and/or meaning of the term "database." Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A gaming machine for providing a game, comprising:

a cabinet an operation unit mounted to the cabinet and configured to receive an operation of a player;

a display unit operably coupled to the operation unit and including:

a first display device mounted to the cabinet and configured to display computer-generated images including a first symbol display area including a plurality of virtual reels displaying a plurality of symbols in a first plurality of cells arranged in a first grid, the first grid having a plurality of rows and a plurality of columns; and a second display device mounted to the cabinet and including a plurality of horizontal mechanical bonus symbol reels, each horizontal mechanical bonus symbol reel displaying a plurality of wild symbols and a plurality of null symbols, each horizontal mechanical bonus symbol reel being associated with a corresponding row of the first grid; and, a control unit operably coupled to the operation unit and the display unit and being configured to initiate a game in response to player operation and to establish an outcome of the game, the control unit including a processor programmed to execute an algorithm including the steps of:

randomly selecting a first plurality of symbols associated with the first symbol display area, each symbol in the first set of symbols being associated with one of the plurality of cells in the first grid, the symbols in the first plurality of symbols being selected from a first set of symbols;

animating the plurality of virtual reels to sequentially spin through the first grid and stop to display the first plurality of symbols within the first grid forming an initial outcome;

spinning and stopping each horizontal mechanical bonus symbol reel to display a bonus pattern of wild symbols; and animating the bonus pattern of wild symbols to appear on the first grid, the bonus pattern of symbols and any remaining symbols from the first plurality of symbols in the first grid forming a second outcome.

2. The gaming machine of claim 1, wherein the processor is programmed to execute the algorithm including the steps of:

rendering the first symbol display area including the first grid including a 4×4×4 cell arrangement.

3. The gaming machine of claim 2, wherein the processor is programmed to execute the algorithm including the steps of:

rendering the first symbol display area including a pair of opposing cell columns displayed on each side of the first grid.

4. The gaming machine of claim 3, wherein the processor is programmed to execute the algorithm including the steps of:

rendering each opposing cell column with including three cells to display the first symbol display area including a 3×4×4×4×3 cell arrangement.

5. The gaming machine of claim 1, wherein each horizontal mechanical bonus symbol reel includes a plurality of symbol locations displaying the plurality of wild symbols and the plurality of null symbols, the processor is programmed to execute the algorithm including the steps of:

stopping each horizontal mechanical bonus symbol reel to display three symbol locations.

6. The gaming machine of claim 1, wherein the second display device includes a horizontal mechanical jackpot prize reel displaying a plurality of jackpot awards, the processor is programmed to execute the algorithm including the steps of:

initiating a jackpot chance feature by spinning and stopping the horizontal mechanical jackpot prize reel to display a jackpot award.

7. The gaming machine of claim 1, wherein the processor is programmed to execute the algorithm including the steps of:

animating a subsequent spinning of the plurality of virtual reels after the horizontal mechanical bonus symbol reels have stopped to display a bonus pattern of wild symbols; and animating the bonus pattern of wild symbols from the second grid to appear on the first grid as the plurality of virtual reels are spinning.

8. A method of operating a gaming machine including a cabinet, a first display device mounted to the cabinet, a second display device mounted to the cabinet, and a control unit including a processor operably coupled to the first display device and the second display device, the first display device configured to display computer-generated images including a first symbol display area including a plurality of virtual reels displaying a plurality of symbols in a first plurality of cells arranged in a first grid having a plurality of rows and a plurality of columns, the second display device including a plurality of horizontal mechanical bonus symbol reels with each horizontal mechanical bonus symbol reel displaying a plurality of wild symbols and a plurality of null symbols and being associated with a corresponding row of the first grid, the method including the processor performing an algorithm including the steps of:

randomly selecting a first plurality of symbols associated with the first symbol display area, each symbol in the first set of symbols being associated with one of the plurality of cells in the first grid, the symbols in the first plurality of symbols being selected from a first set of symbols;

animating the plurality of virtual reels to sequentially spin through the first grid and stop to display the first plurality of symbols within the first grid forming an initial outcome;

spinning and stopping each horizontal mechanical bonus symbol reel to display a bonus pattern of wild symbols; and animating the bonus pattern of wild symbols to appear on the first grid, the bonus pattern of symbols and any remaining symbols from the first plurality of symbols in the first grid forming a second outcome.

9. The method of claim 8, including the processor performing the algorithm including the steps of:

rendering the first symbol display area including the first grid including a 4×4×4 cell arrangement.

10. The method of claim 9, including the processor performing the algorithm including the steps of:

rendering the first symbol display area including a pair of opposing cell columns displayed on each side of the first grid.

11. The method of claim 10, including the processor performing the algorithm including the steps of:

rendering each opposing cell column with including three cells to display the first symbol display area including a 3×4×4×4×3 cell arrangement.

12. The method of claim 8, wherein each horizontal mechanical bonus symbol reel includes a plurality of symbol locations displaying the plurality of wild symbols and the plurality of null symbols, the method including the processor performing the algorithm including the steps of:

stopping each horizontal mechanical bonus symbol reel to display three symbol locations.

13. The method of claim 8, wherein the second display device includes a horizontal mechanical jackpot prize reel displaying a plurality of jackpot awards, the method including the processor performing the algorithm including the steps of:

initiating a jackpot chance feature by spinning and stopping the horizontal mechanical jackpot prize reel to display a jackpot award.

14. The method of claim 8, including the processor performing the algorithm including the steps of:

animating a subsequent spinning of the plurality of virtual reels after the horizontal mechanical bonus symbol reels have stopped to display a bonus pattern of wild symbols; and animating the bonus pattern of wild symbols from the second grid to appear on the first grid as the plurality of virtual reels are spinning.

15. A non-transitory computer-readable storage media having computer-executable instructions embodied thereon for operating a gaming machine including a cabinet, a first display device mounted to the cabinet, a second display device mounted to the cabinet, and a control unit including a processor operably coupled to the first display device and the second display device, the first display device configured to display computer-generated images including a first symbol display area including a plurality of virtual reels displaying a plurality of symbols in a first plurality of cells arranged in a first grid having a plurality of rows and a plurality of columns, the second display device including a plurality of horizontal mechanical bonus symbol reels with each horizontal mechanical bonus symbol reel displaying a plurality of wild symbols and a plurality of null symbols and being associated with a corresponding row of the first grid, when executed by the processor the computer-executable instructions cause the processor to perform an algorithm including the steps of:

randomly selecting a first plurality of symbols associated with the first symbol display area, each symbol in the first set of symbols being associated with one of the plurality of cells in the first grid, the symbols in the first plurality of symbols being selected from a first set of symbols;

animating the plurality of virtual reels to sequentially spin through the first grid and stop to display the first plurality of symbols within the first grid forming an initial outcome;

spinning and stopping each horizontal mechanical bonus symbol reel to display a bonus pattern of wild symbols; and animating the bonus pattern of wild symbols to appear on the first grid, the bonus pattern of symbols and any remaining symbols from the first plurality of symbols in the first grid forming a second outcome.

16. The non-transitory computer-readable storage media of claim 15, wherein the computer-executable instructions cause the at least one processor to perform the algorithm including the steps of:

rendering the first symbol display area including the first grid including a 4×4×4 cell arrangement.

17. The non-transitory computer-readable storage media of claim 16, wherein the computer-executable instructions cause the at least one processor to perform the algorithm including the steps of:

rendering the first symbol display area including a pair of opposing cell columns displayed on each side of the first grid.

18. The non-transitory computer-readable storage media of claim 17, wherein the computer-executable instructions cause the at least one processor to perform the algorithm including the steps of:

rendering each opposing cell column with including three cells to display the first symbol display area including a 3×4×4×4×3 cell arrangement.

19. The non-transitory computer-readable storage media of claim 15, wherein each horizontal mechanical bonus symbol reel includes a plurality of symbol locations displaying the plurality of wild symbols and the plurality of null symbols, the computer-executable instructions cause the processor to perform the algorithm including the steps of:

stopping each horizontal mechanical bonus symbol reel to display three symbol locations.

20. The non-transitory computer-readable storage media of claim 15, wherein the second display device includes a horizontal mechanical jackpot prize reel displaying a plurality of jackpot awards, the computer-executable instructions cause the processor to perform the algorithm including the steps of:

initiating a jackpot chance feature by spinning and stopping the horizontal mechanical jackpot prize reel to display a jackpot award.

* * * * *